(12) United States Patent
Harada et al.

(10) Patent No.: US 11,006,258 B2
(45) Date of Patent: May 11, 2021

(54) EXTERNAL COMMUNICATION SYSTEM FOR VEHICLE

(71) Applicant: SUBARU CORPORATION, Tokyo (JP)

(72) Inventors: Masaaki Harada, Tokyo (JP); Ayaka Ohki, Tokyo (JP); Hisataro Iinami, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/787,588

(22) Filed: Feb. 11, 2020

(65) Prior Publication Data
US 2020/0314608 A1 Oct. 1, 2020

(30) Foreign Application Priority Data

Mar. 27, 2019 (JP) .............................. JP2019-060657

(51) Int. Cl.
H04W 4/40 (2018.01)
H04W 24/04 (2009.01)
H04W 40/12 (2009.01)
H04W 40/22 (2009.01)
H04W 88/04 (2009.01)

(52) U.S. Cl.
CPC ............. H04W 4/40 (2018.02); H04W 24/04 (2013.01); H04W 40/12 (2013.01); H04W 40/22 (2013.01); H04W 88/04 (2013.01)

(58) Field of Classification Search
CPC ..... H04W 76/14; H04W 76/15; H04W 84/12; H04W 4/46; H04W 88/16; H04W 92/18; H04W 12/1002; H04W 36/00; H04W 36/0016; H04W 36/0027; H04W 36/16; H04W 36/28; H04W 40/246; H04W 4/027; H04W 52/40; H04W 4/40; H04W 36/305; H04L 1/1819; H04B 17/318; H04B 7/0626; H04B 17/373; H04B 17/27
See application file for complete search history.

(56) References Cited

U.S. PATENT DOCUMENTS

2018/0122234 A1* 5/2018 Nascimento ......... G08G 1/0145

FOREIGN PATENT DOCUMENTS

JP 2018-077652 A 5/2018

* cited by examiner

Primary Examiner — Tu X Nguyen
(74) Attorney, Agent, or Firm — McDermott Will & Emery LLP

(57) ABSTRACT

An external communication system for a vehicle includes multiple communication devices and a controller. The multiple communication devices are provided in the vehicle. The communication devices transmit and receive communication data between a server device and the vehicle via mutually different communication paths. The controller is control communication by the multiple communication devices. The controller sets at least one of the multiple communication devices as a main communication device that transmits and receives the communication data between the server device and the vehicle. The controller sets at least one of the remaining communication devices as a backup communication device that transmits and receives the communication data between the server device and the vehicle.

19 Claims, 10 Drawing Sheets

FIG. 8A

V2V COMMUNICATION DESTINATION LIST (62)

| V2V COMMUNICATION LIST | PRIORITY | CHANNEL INFORMATION |
|---|---|---|
| SECOND AUTOMOBILE | FIRST PRIORITY | . . . |
| THIRD AUTOMOBILE | SECOND PRIORITY | . . . |
| FOURTH AUTOMOBILE | THIRD PRIORITY | . . . |
| FIFTH AUTOMOBILE | DEGENERATED CANDIDATE | . . . |
| SIXTH AUTOMOBILE | THIRD PRIORITY | . . . |
| SEVENTH AUTOMOBILE | NG | . . . |
| EIGHTH AUTOMOBILE | - | . . . |

FIG. 8B

BACKUP COMMUNICATION DESTINATION LIST (63)

| COMMUNICATION CHANNEL LIST | PRIORITY | CHANNEL INFORMATION |
|---|---|---|
| CELLULAR COMMUNICATION | ○ | |
| ADAS COMMUNICATION | ○ | |
| SECOND AUTOMOBILE | FIRST PRIORITY | . . . |
| THIRD AUTOMOBILE | SECOND PRIORITY | . . . |
| FOURTH AUTOMOBILE | THIRD PRIORITY | . . . |
| FIFTH AUTOMOBILE | DEGENERATED CANDIDATE | . . . |

EXTERNAL COMMUNICATION SYSTEM FOR VEHICLE

CROSS-REFERENCE TO RELATED APPLICATIONS

The present application claims priority from Japanese Patent Application No. 2019-060657 filed on Mar. 27, 2019, the entire contents of which are hereby incorporated by reference.

BACKGROUND

The disclosure relates to an external communication system for a vehicle.

A communication device is provided in a vehicle such as an automobile in order to receive map data through the Internet or traffic information (Japanese Unexamined Patent Application Publication (JP-A) No. 2018-077652).

SUMMARY

An aspect of the disclosure provides an external communication system for a vehicle includes multiple communication devices and a controller. The multiple communication devices are provided in the vehicle. The communication devices are configured to transmit and receive communication data between a server device and the vehicle via mutually different communication paths. The controller is configured to control communication by the multiple communication devices. The controller is configured to set at least one of the multiple communication devices as a main communication device to transmit and receive the communication data between the server device and the vehicle. The controller is configured to set at least one of the remaining communication devices as a backup communication device to transmit and receive the communication data between the server device and the vehicle.

BRIEF DESCRIPTION OF THE DRAWINGS

The accompanying drawings are included to provide a further understanding of the disclosure and are incorporated in and constitute apart of this specification. The drawings illustrate an example embodiment and, together with the specification, serve to explain the principles of the disclosure.

FIG. 5 is a flowchart of one example of processing for switching the communication of the first automobile to the alternative communication or the like.

FIGS. 8A and 8B are diagrams of examples of a V2V communication destination list and a backup communication destination list, which are generated in the first automobile by the processing in FIG. 7.

DETAILED DESCRIPTION

A vehicle such as an automobile moves, so that a communication environment on a communication device that is provided in the vehicle changes all the time in accordance with the movement of the vehicle.

Therefore, communication data that is transmitted and received between the communication device that is provided in the vehicle and a server device may be lost during the communication or the communication is interrupted due to the movement of the vehicle.

It is expected that the vehicle is requested to correspond to an intelligent transport system such as an ADAS, and is requested to directly or indirectly use communication data in order to control the travel of the vehicle in the future.

Such notable communication data being unable to be received in the moving vehicle indicates that the control based on the communication data is unavailable.

Therefore, it is to be prevented that the vehicle becomes unable to transmit and receive communication data due to the interruption, the loss, and the like of the communication data during the movement.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
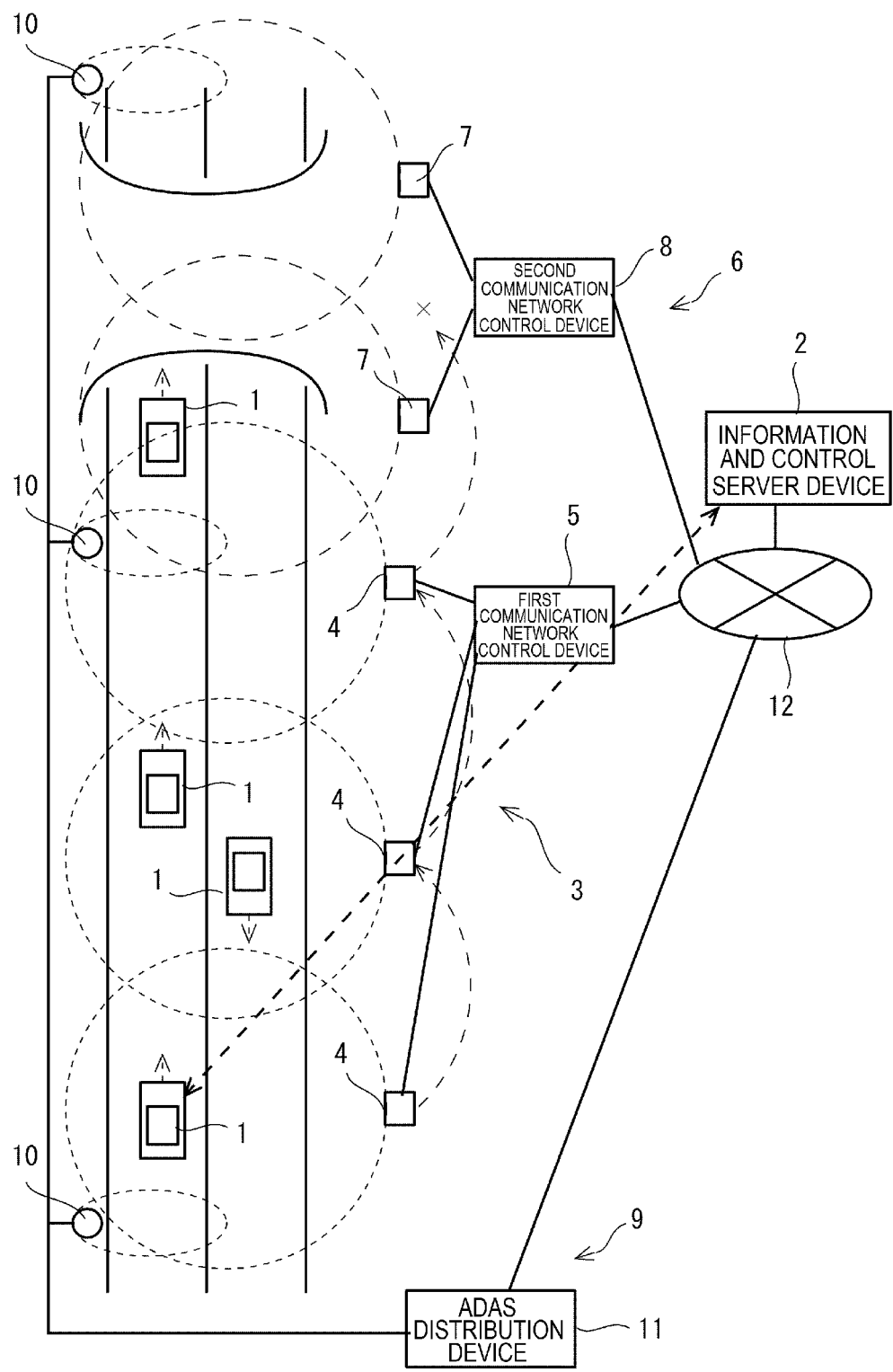
FIG. 1 is a diagram of automobiles and multiple traffic systems to which an embodiment of the disclosure e is applied.

FIG. 1 is a diagram of automobiles 1 and multiple traffic systems to which an embodiment of the disclosure is applied.

FIG. 1 illustrates the multiple automobiles 1 that travel on a bidirectionally passable road, an information and control server device 2 that transmits and receives communication data with the automobiles 1, a first cellular communication network system 3, and a second cellular communication network system 6, an advanced driver assistance system (ADAS) communication system 9, and the Internet 12. The automobile 1 is one example of the vehicle. The first cellular communication network system 3, the second cellular communication network system 6, and the ADAS communication system 9 are multiple traffic systems.

Each of the multiple automobiles 1 includes, as will be described later, multiple communication devices such as a cellular communication device 33 that is communicable with the first cellular communication network system 3 or the second cellular communication network system 6, and an ADAS communication device 34 that communicates with the ADAS communication system 9.

The first cellular communication network system 3 includes, as communication equipment that is managed by a first carrier, multiple first cellular base stations 4 that are disposed in a distributed manner in regions including roads, and a first communication network control device 5. The first communication network control device 5 is coupled to the multiple first cellular base stations 4. The first communication network control device 5 selects, among the multiple first cellular base stations 4, the first cellular base station 4 in a communication cell containing an automobile 1 that signs up with the first carrier, and establishes a wireless communication path between the automobile 1 and the first cellular base station 4.

The second cellular communication network system 6 includes, as communication equipment that is managed by a second carrier, multiple second cellular base stations 7 that are disposed in a distributed manner in regions including roads, and a second communication network control device 8. The second communication network control device 8 is coupled to the multiple second cellular base stations 7. The second communication network control device 8 selects, among the multiple second cellular base stations 7, the second cellular base station 7 in a communication cell containing an automobile 1 that signs up with the second carrier, and establishes a wireless communication path between the automobile 1 and the second cellular base station 7.

The ADAS communication system 9 includes multiple ADAS communication devices 10, and an ADAS distribution device 11. The ADAS distribution device 11 is coupled to the multiple ADAS communication devices 10. The ADAS distribution device 11 wirelessly transmits communication data including regional traffic information, and map information such as a dynamic map, for example, from the multiple ADAS communication devices 10. Moreover, the ADAS distribution device 11 may receive communication data from the multiple automobiles 1 travelling on the road, via the multiple ADAS communication devices 10.

The Internet 12 is coupled to the first communication network control device 5, the second communication network control device 8, the ADAS distribution device 11, and the information and control server device 2. The Internet 12 provides, with respect to devices that are coupled thereto, communication paths for transmitting and receiving communication data with the other devices.

This enables the automobile 1 contained in the communication cell of the first cellular base station 4, for example, and the information and control server device 2 to bidirectionally transmit and receive communication data.

For example, the information and control server device 2 outputs communication data the transmission destination of which is the automobile 1 to the Internet 12. The communication data output to the Internet 12 is transmitted to the automobile 1 via the first communication network control device 5 and the first cellular base station 4. When the automobile 1 moves, the first communication network control device 5 can switch the first cellular base station 4, and thus continue the transmission to the automobile 1. Moreover, the communication data output to the Internet 12 may be transmitted to the automobile 1 via the ADAS distribution device 11 and the ADAS communication device 10.

Examples of communication data to be transmitted by the information and control server device 2 to the automobile 1 include, for example, map information on a region in which the automobile 1 travels, traffic information on congestion, a pedestrian, and the automobile 1, and control information on the automobile 1.

Moreover, examples of communication data to be transmitted by the automobile 1 to the information and control server device 2 include travel information such as a movement direction and a movement speed of the automobile 1, and information on a future control state, for example.

Figure 2:
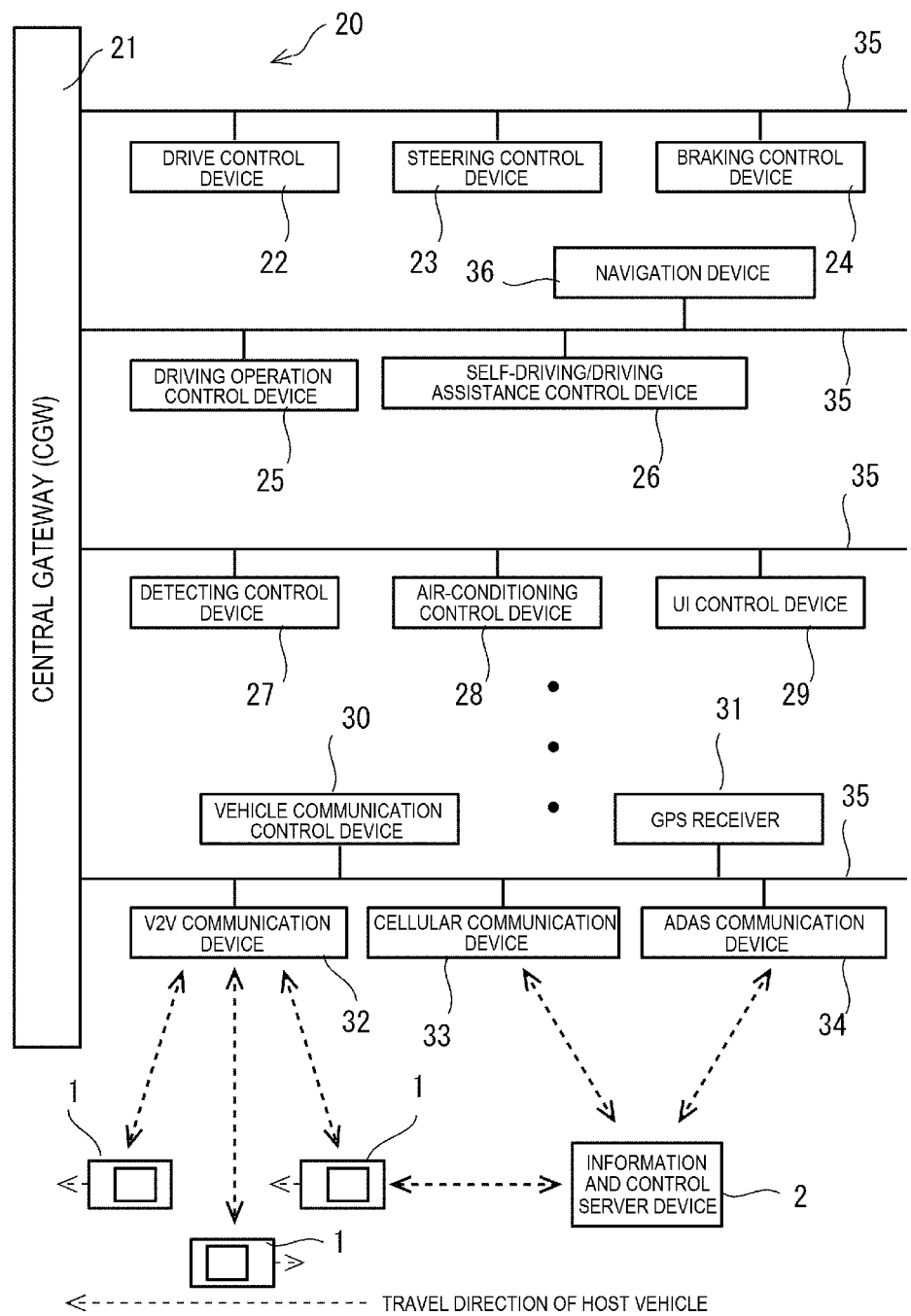
FIG. 2 is a diagram of a control system of the automobile according to the embodiment of the disclosure.

FIG. 2 is a diagram of a control system 20 of the automobile 1 according to the embodiment of the disclosure.

The control system 20 of the automobile 1 in FIG. 2 includes a central gateway (CGW) 21, a drive control device 22, a steering control device 23, a braking control device 24, a driving operation control device 25, a self-driving/driving assistance control device 26, a detecting control device 27, an air-conditioning control device 28, a user interface (UI) control device 29, a vehicle communication control device 30, a global positioning system (GPS) receiver 31, a vehicle to vehicle (V2V) communication device 32 as an inter-vehicle communication device, the cellular communication device 33, the ADAS communication device 34, and a network 35 that couples these devices. Moreover, a navigation device 36 is coupled to the network 35.

The network 35 is configured with an in-vehicle network such as a controller area network (CAN) and a local interconnect network (LIN), for example, which are employed in the automobile 1. The network 35 may further include a computer network based on the IEEE 802.3 standard, for example.

The central gateway 21 manages the communication in the network 35. The central gateway 21 includes a traffic control function of CAN packets and DIAG packets in on-board diagnostics (OBD) 2, a security function, and the like.

The driving operation control device 25 generates manual operation data in response to an operation of a steering wheel, which is not illustrated, by a user, and outputs the manual operation data to the network 35. The drive control device 22, the steering control device 23, and the braking control device 24 acquire the manual operation data from the network 35, and control travel of the automobile 1.

The detecting control device 27 generates detection data based on an image in which an inside and a surrounding of the automobile 1 are captured by a camera, which is not illustrated, and outputs the detection data to the network 35.

The GPS receiver 31 receives radio waves from a GPS satellite, which is not illustrated, and generates position data indicating a current position of the automobile 1.

The self-driving/driving assistance control device 26 acquires the detection data, the position data, and the like from the network 35, generates automatic operation data for controlling or supporting the travel of the automobile 1, and outputs the automatic operation data to the network 35. The drive control device 22, the steering control device 23, and the braking control device 24 acquire the automatic operation data from the network 35, and control travel of the automobile 1.

The UI control device 29 includes a display device and an operation device, which are not illustrated, generates UI operation data in response to a user operation to the operation device in accordance with the display on the display device, and outputs the UI operation data to the network 35.

The air-conditioning control device 28 acquires the UI operation data from the network 35, and controls air-conditioning of the automobile 1. Moreover, the self-driving/driving assistance control device 26 acquires the UI operation data from the network 35, and switches setting, such as on and off of the driving support and on and off of the self-driving, of the automobile 1.

The cellular communication device 33 performs bidirectional communication with a cellular base station, and transmits and receives communication data.

The ADAS communication device 34 performs one-way or bidirectional communication with the ADAS communication device 10 for an intelligent transport system, and transmits and receives communication data.

The V2V communication device 32 performs bidirectional communication with a V2V communication device 32 of another vehicle that is present in the surrounding of a host vehicle, and transmits and receives communication data. FIG. 2 illustrates the multiple automobiles 1 that are travelling in the same direction along the travel direction of the host vehicle, and the automobile 1 that is travelling in the reverse direction. In this case, the V2V communication device 32 can individually establish communication paths with the respective multiple other vehicles, and bidirectionally transmit and receive communication data.

As illustrated in FIG. 2, the information and control server device 2 can transmit and receive communication data with the cellular communication device 33 via the cellular communication network system. Moreover, the information and control server device 2 can transmit and receive communication data with the ADAS communication device 34 via the cellular communication system 9. Moreover, the information and control server device 2 can transmit and receive communication data with the V2V communication device 32 via the cellular communication network system or the ADAS communication system 9, and another vehicle. Therefore, the multiple communication devices that are provided in the automobile can transmit and receive communication data between the information and control server device 2 and the automobile 1, via the mutually different communication paths.

The vehicle communication control device 30 controls the communication by the plural communication devices, such as the V2V communication device 32, the cellular communication device 33, and the ADAS communication device 34, that are provided in the automobile 1. The vehicle communication control device 30 selects the V2V communication device 32, the cellular communication device 33, or the ADAS communication device 34, and causes the selected device to transmit and receive communication data with the information and control server device 2, for example. As illustrated in FIG. 1, the multiple communication cells by the cellular communication network system are basically set in regions without any gap. In contrast, a coverage range of the ADAS communication device 10 is basically discrete. Accordingly, communication that is stable and difficult to be disconnected during the movement of the automobile 1 is basically more possible in the communication by the cellular communication device 33, than the communication by the ADAS communication device 34. In this case, the vehicle communication control device 30 basically uses the cellular communication device 33 as a first communication device, and gives a higher priority to the communication by the cellular communication device 33 than priorities given to the communication by the other communication devices.

Figure 3:
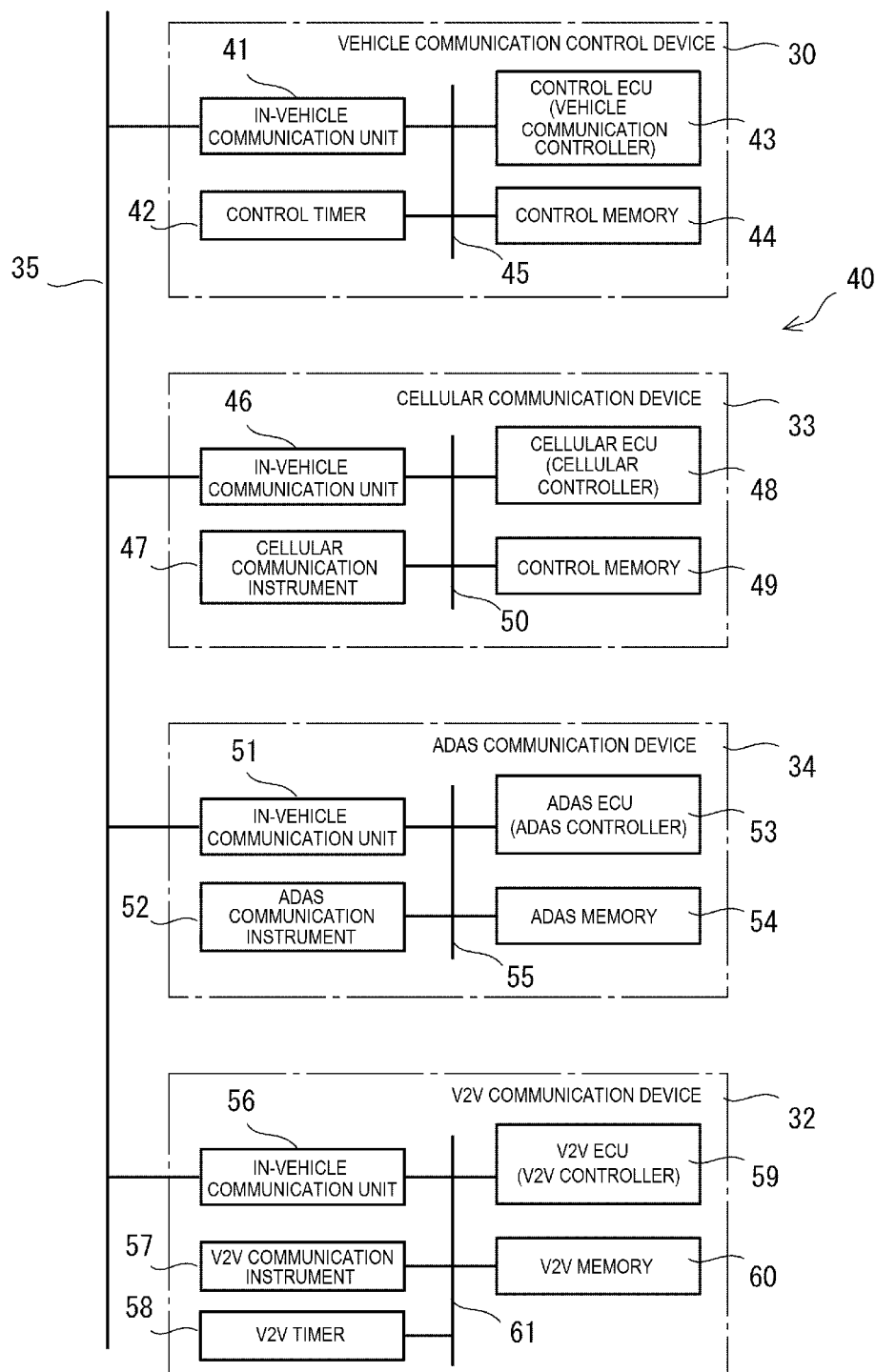
FIG. 3 is a diagram of an external communication system that manages multiple communication devices provided in the automobile according to the embodiment of the disclosure.

FIG. 3 is a diagram of an external communication system 40 that manages the multiple communication devices provided in the automobile 1, according to the embodiment of the disclosure.

The external communication system 40 in FIG. 3 includes the vehicle communication control device 30, the cellular communication device 33, the ADAS communication device 34, the V2V communication device 32, and the network 35 that couples these devices.

The vehicle communication control device 30 includes an in-vehicle communication unit 41, a control timer 42, a control electric control unit (ECU) 43, a control memory 44, and an internal bus 45 that couples these units.

The cellular communication device 33 includes an in-vehicle communication unit 46, a cellular communication instrument 47 that transmits and receives communication data by the bidirectional communication with a cellular base station, a cellular ECU 48, a cellular memory 49, and an internal bus 50 that couples these units.

The ADAS communication device 34 includes an in-vehicle communication unit 51, an ADAS communication instrument 52 that can transmit and receive communication data by the bidirectional communication with the ADAS communication device 10, an ADAS ECU 53, an ADAS memory 54, and an internal bus 55 that couples these units.

The V2V communication device 32 includes an in-vehicle communication unit 56, a V2V communication instrument 57 that transmits and receives communication data by the bidirectional communication with a V2V communication device 32 of another vehicle, a V2V timer 58, a V2V ECU 59, a V2V memory 60, and an internal bus 61 that couples these units.

The in-vehicle communication units 41, 46, 51, and 56 are coupled to the network 35. The in-vehicle communication units 41, 46, 51, and 56 transmit and receive data via the network 35 with the in-vehicle communication unit of anther device that is coupled to the network 35.

The control timer 42 and the V2V timer 58 measure the time or the elapsed time.

The control memory 44 is, for example, a semiconductor memory, and records a program and data. The semiconductor memory has a limited storage capacity. The control ECU 43 reads a program from the control memory 44, and executes the program, with a processing ability thereof. This implements a vehicle communication controller that controls an operation of the vehicle communication control device 30, in the control ECU 43.

The cellular memory 49 is, for example, a semiconductor memory, and records a program and data. The cellular ECU 48 reads a program from the control memory 44, and executes the program, with a processing ability thereof. This implements a cellular controller that controls an operation of the cellular communication device 33, in the cellular ECU 48.

The ADAS memory 54 is, for example, a semiconductor memory, and records a program and data. The ADAS ECU 53 reads a program from the ADAS memory 54, and executes the program, with a processing ability thereof. This implements an ADAS controller that controls an operation of the ADAS communication device 34, in the ADAS ECU 53.

The V2V memory 60 records a program and data. The V2V ECU 59 reads a program from the V2V memory 60, and executes the program. This implements a V2V controller that controls an operation of the V2V communication device 32, in the V2V ECU 59.

Figure 4:
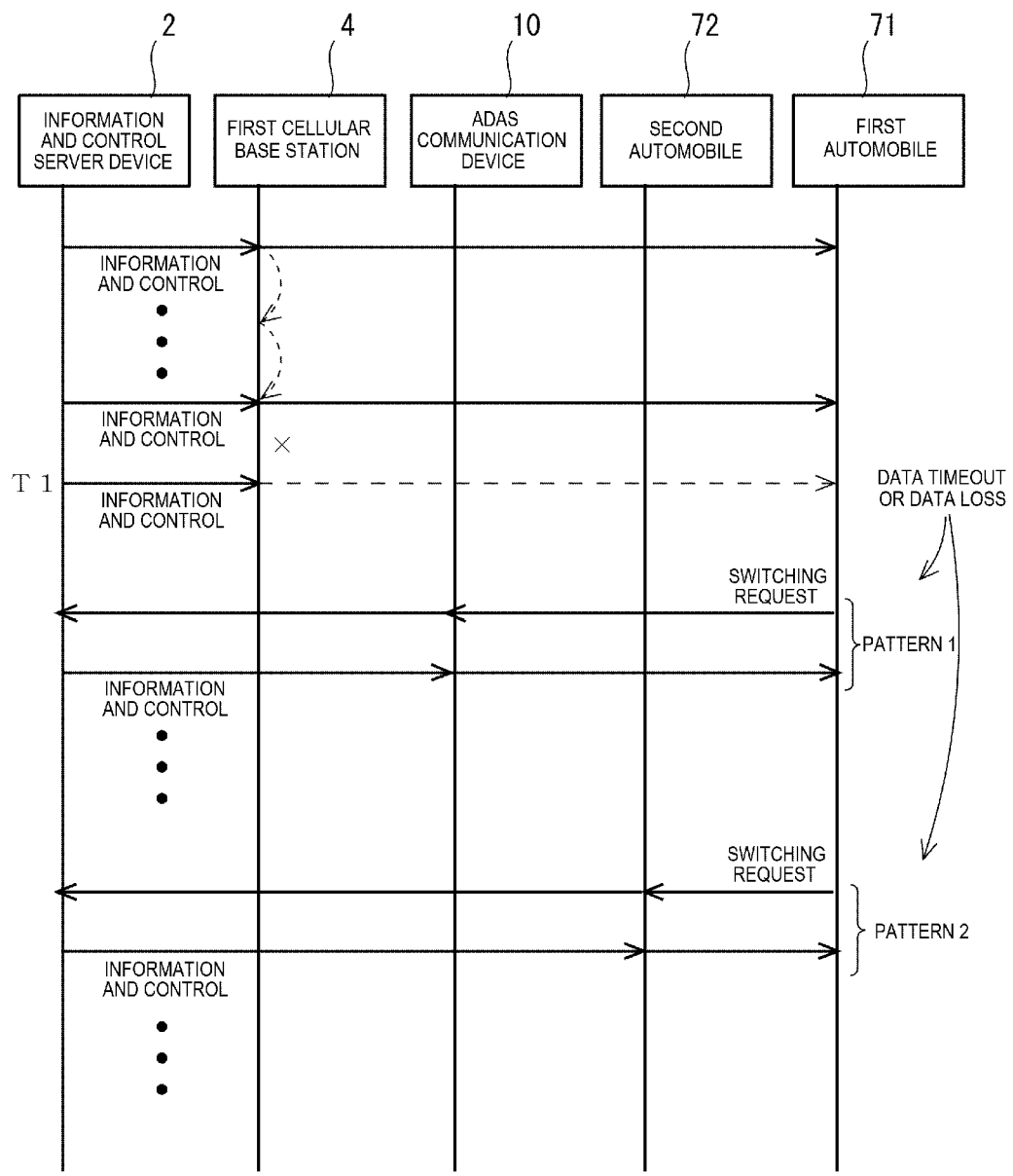
FIG. 4 is a sequence chart for indicating switching processing to alternative communication for continuing communication when a problem occurs in the communication between an information and control server device and a first automobile.

FIG. 4 is a sequence chart for explaining switching processing to alternative communication for continuing communication when a problem occurs in the communication between the information and control server device 2 and a first automobile 71.

FIG. 4 illustrates the information and control server device 2, the first cellular base station 4, the ADAS communication device 10, a second automobile 72, and the first automobile 71. The first automobile 71 and the second automobile 72 commonly include the devices in FIG. 3. In the drawing, the processing flows from top to bottom.

The information and control server device 2 and the first automobile 71 may transmit and receive communication data normally via the first cellular base station 4. In this case, for example, communication data that the information and control server device 2 transmits to the first automobile 71 is transmitted from the information and control server device 2 to the first cellular base station 4, and is transmitted from the first cellular base station 4 to the first automobile 71. When the automobile 1 travels from the bottom toward the top in FIG. 1 and reaches a tunnel, for example, the automobile 1 is out of the communication cells of the multiple first cellular base stations 4 in the first cellular communication network system 3. Only the multiple second cellular base stations 7 in the second cellular communication network system 6 are disposed in the mountain area, which is in front and behind the tunnel. The communication environment of the cellular communication device 33 in the first automobile 71 is changed from a communication-possible environment to a communication-impossible environment. In this case, as illustrated a dotted line T1 in the drawing, the first cellular base stations 4 is unable to communicate with the first automobile 71. The communication data to be transmitted by the information and control server device 2 to the first automobile 71 is not transmitted to the first automobile 71 because the communication data is lost during the communication or the communication is interrupted due to the movement of the first automobile 71.

When the first automobile 71 directly or indirectly uses communication data in order to control the travel, for example, the first automobile 71 is unable to perform the control based on the communication data.

For example, in a case where the first automobile 71 includes control data such as the accelerator opening angle, the brake pressure, and the steering torque, as control data, and the braking devices such as the drive control device 22, the steering control device 23, the braking control device 24, the driving operation control device 25, and the self-driving/driving assistance control device 26 of the first automobile 71 control the travel or the like based on multiple pieces of the control data to be continuously received, when the communication data is not acquired as appropriate, the travel may be affected. Such control data may have a large amount, and may be requested to have high real-time characteristics.

Therefore, it is to be prevented as much as possible that the automobile 1 becomes unable to transmit and receive the communication data due to an interruption, a loss, and the like of the communication data during the movement, without relying on the communication by one communication device.

As illustrated in a pattern 1 in the drawing, for example, when detecting loss of communication data or a timeout in communication data, the first automobile 71 transmits a switching request using the ADAS communication device 34, which is different from the cellular communication device 33 having been used until then. This enables the information and control server device 2 to transmit communication data to the first automobile 71 via the ADAS communication device 10.

In addition, as illustrated in a pattern 2 in the drawing, for example, when detecting loss of communication data loss or timeout, the first automobile 71 transmits a switching request using the V2V communication device 32, which is different from the cellular communication device 33 having been used until then. This enables the information and control server device 2 to transmit the communication data to the first automobile 71 via the second automobile 72.

By switching the communication device to make alternative communication available, the information and control server device 2 and the first automobile 71 can restart and continue the communication.

Figure 5:
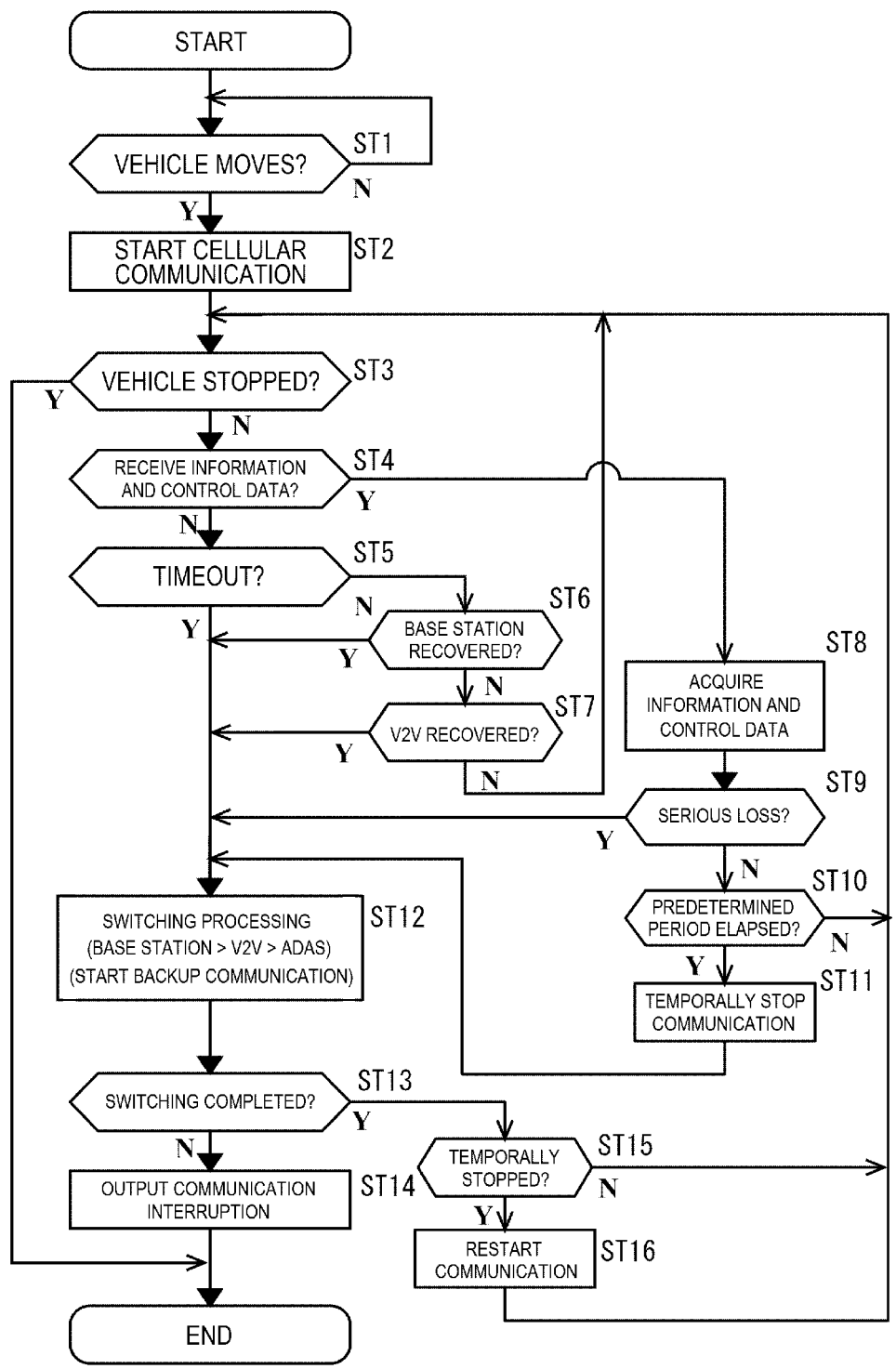

FIG. 5 is a flowchart of one example of processing for switching the communication of the first automobile 71 to alternative communication or the like.

A vehicle communication controller of the vehicle communication control device 30 in the first automobile 71 that intends to communicate with the information and control server device 2 executes the processing of FIG. 5 when the first automobile 71 is started for travel or the like. When malfunction occurs in the communication in use, the vehicle communication controller switches the communication device to be used in the multiple communication devices, thereby executing the alternative communication. Herein, the communication device being communicated is called a main communication device, and a communication device to be used by switching due to the alternative communication is called a backup communication device.

At Step ST1, the vehicle communication controller of the first automobile 71 determines whether the automobile 1 has been started. The vehicle communication controller may determine that the automobile 1 has been started based on an ignition switch of the automobile 1, which is not illustrated, having been operated from an off state to an on state, for example. In this case, the vehicle communication controller causes the processing to proceed to Step ST2. In other cases, the vehicle communication controller repeats the start determination at Step ST1.

At Step ST2, the vehicle communication controller of the first automobile 71 starts communication by the cellular communication device 33, as a first communication device. The cellular communication device 33 serves as a main communication device. The cellular communication device 33 starts the communication with a cellular base station, and establishes a communication path with the information and control server device 2. The information and control server device 2 and the cellular communication device 33 of the first automobile 71 start transmission and reception of bidirectional communication data. The cellular communication can be expected at the present time to stably maintain the fastest communication in a wide area, compared with the ADAS communication and the V2V communication. When the ADAS communication will be able to stably maintain the fastest communication in a wide area in the future, the vehicle communication controller may select the ADAS communication device 34 as a first communication device at Step ST2.

At Step ST3, the vehicle communication controller of the first automobile 71 determines whether the automobile 1 has been stopped. The vehicle communication controller may determine that the automobile 1 has been stopped based on the ignition switch of the automobile 1, which is not illustrated, having been operated from an on state to an off state, for example. In this case, the vehicle communication controller ends the processing in FIG. 5. In other cases, the vehicle communication controller causes the processing to proceed to Step ST4.

At Step ST4, the vehicle communication controller of the first automobile 71 determines whether the cellular communication device 33 serving as the main communication device has received communication data from the information and control server device 2. If the cellular communication device 33 has received new communication data from the information and control server device 2, for example, the vehicle communication controller causes the processing to proceed to Step ST8. If the cellular communication device 33 has received no new communication data, the vehicle communication controller causes the processing to proceed to Step ST5.

At Step ST5, the vehicle communication controller of the first automobile 71 determines whether the reception interval of the communication data has exceeded a timeout period of the communication. The vehicle communication controller may determine whether the timeout has occurred based on an elapsed time from previous communication data that is measured by the control timer 42. The vehicle communication controller calculates an average reception interval of communication data from the information and control server device 2 is calculated in advance for example. When the time measured by the control timer 42, as an elapsed time from the previous reception, exceeds the reception interval, the vehicle communication controller determines that the timeout period of communication has been exceeded, and causes the processing to proceed to Step ST12. If the vehicle communication controller determines that the timeout period of communication has not been exceeded, the vehicle communication controller causes the processing to proceed to Step ST6.

At Step ST6, the vehicle communication controller of the first automobile 71 determines whether the communication for cellular communication between the cellular communication device 33 and the cellular base station has been recovered. After failure has occurred in the communication between the cellular communication device 33 and the cellular base station, when the communication has become available again, the vehicle communication controller determines that the communication has been recovered, and causes the processing to proceed to Step ST12. In other cases, that is, the case where no failure has occurred in the communication between the cellular communication device 33 and the cellular base station, or the case where failure has continuously occurred in the communication between the cellular communication device 33 and the cellular base station, the vehicle communication controller causes the processing to proceed to Step ST7.

At Step ST7, the vehicle communication controller of the first automobile 71 determines whether the V2V communication has been recovered. If the V2V communication device 32 of the host vehicle becomes a communication possible state with the V2V communication device 32 of another vehicle after a communication impossible state with the V2V communication device 32 of another vehicle, the vehicle communication controller determines that the communication has been recovered, and causes the processing to proceed to Step ST12. In other cases, that is, the cases where the V2V communication device 32 of the host vehicle is in a continuously communication possible state with the V2V communication device 32 of another vehicle, and is in a continuously communication impossible state with the V2V communication device 32 of another vehicle, the vehicle communication controller returns the processing to Step ST3.

At Step ST8, the vehicle communication controller of the first automobile 71 acquires the communication data received from the information and control server device 2.

At Step ST9, the vehicle communication controller of the first automobile 71 determines the presence or absence of a serious loss of the communication data based on the acquired communication data. When a time difference between a time stamp of the communication data acquired at the previous time and a time stamp of the communication data acquired at this time is longer than several times of a normal communication interval, for example, the vehicle communication controller determines that a serious loss is present, and causes the processing to proceed to Step ST12. In other cases, a case where communication data on successive time stamps can continuously be received, for example, or a case where loss of communication data is minor, the vehicle communication controller causes the processing to proceed to Step ST10. Whether the loss of communication data is serious or minor depends on the content of the communication data. When communication data is used for self-driving in the automobile 1, for example, loss of a single piece of communication data may lead to a serious loss. In contrast, when communication data is used in the automobile 1 for entertainment, loss of several tens to several hundreds of pieces of data may be determined as minor loss. A criterion for determining whether the loss of communication data is serious may be changed depending on the type and the content of the communication data.

At Step ST10, the vehicle communication controller of the first automobile 71 determines whether a predetermined period has elapsed since the communication with the information and control server device 2 by the main communication device has been started. The predetermined period may be a period in which a change in the travel environment of the first automobile 71 can be generally assumed, for example. The change in the travel environment differs depending on the traveling speed or the like of the first automobile 71. In this case, a different period may be used as the predetermined period that is used for the determination at Step ST10 depending on the traveling speed of the automobile 1 or the like. When the movement speed of the automobile 1 is continuously in a low state due to traffic jam, the predetermined period may be several tens of minutes. In contrast, when the automobile 1 travels on the wound highway in a city area, the communication environment may be changed for each period of about several seconds to several tens of seconds. If the predetermined period has elapsed, the vehicle communication controller causes the processing to proceed to Step ST11. If the predetermined period has not elapsed, the vehicle communication controller returns the processing to Step ST3.

At Step ST11, the vehicle communication controller of the first automobile 71 temporally stops the communication with the information and control server device 2 by the main communication device. The main communication device stops the transmission of the own communication data, and transmits a temporal stop request to the information and control server device 2. The information and control server device 2 having received the temporal stop request stops the transmission of the communication data.

At Step ST12, the vehicle communication controller of the first automobile 71 executes processing of switching the main communication device to be used for the communication with the information and control server device 2.

The switching processing at Step ST12 will be described in details later. The vehicle communication controller selects a new communicable main communication device, from the cellular communication device 33, the V2V communication device 32, and the ADAS communication device 34 in this order, and causes the new main communication device to start the communication with the information and control server device 2. The vehicle communication controller selects the other communication devices as backup communication devices that do not communicate with the information and control server device 2, and stops the communication with the information and control server device 2 by the backup devices. For example, when the communication device that communicates with the information and control server device 2 is switched from the cellular communication device 33 having been selected as the main communication device to the V2V communication device 32 having been selected as the backup communication device, the external communication system 40 starts the backup communication by the V2V communication device 32 to be newly selected as the main communication device.

At Step ST13, the vehicle communication controller of the first automobile 71 determines whether the switching of the main communication device was able to be completed. Depending on the communication environment of the automobile 1, all the communication devices may be unable to perform communication. In this case, the vehicle communication controller can perform neither the main communication nor the backup commutation. If the switching of the main communication device was unable to be completed, the vehicle communication controller causes the processing to proceed to Step ST14. If the switching of the main communication device was able to be completed, the vehicle communication controller causes the processing to proceed to Step ST15.

At Step ST14, the vehicle communication controller of the first automobile 71 outputs communication interruption to the network 35 of the first automobile 71. This causes the various control devices that are coupled to the network 35 of the first automobile 71 execute the processing corresponding to the communication interruption. The first automobile 71 starts travelling in a state of being disconnected from the information and control server device 2, for example, travelling by manual driving or perfect autonomous driving.

At Step ST15, the vehicle communication controller of the first automobile 71 determines whether the communication with the information and control server device 2 is being temporally stopped. At Step ST11, the vehicle communication controller temporally stop the communication. Temporally stopping the communication in the switching processing in this manner can prevent loss of the communication data during the switching. Complicated communication control for preventing loss of the communication data during the switching is not used. In a case where the communication has been temporally stopped, the vehicle communication controller determines that the communication is being temporally stopped, and causes the processing to proceed to Step ST16. In other cases, the vehicle communication controller returns the processing to Step ST3.

At Step ST16, the vehicle communication controller of the first automobile 71 restarts the communication with the information and control server device 2 that has been determined as being temporally stopped. If the main communication device has been switched at Step ST12, the new main communication device, for example, the V2V communication device 32 restarts the communication with the information and control server device 2 via another vehicle.

As in the foregoing, when at least one of multiple communication devices is used as a main communication device that transmits and receives between the server device and the automobile 1, the remaining communication devices of the multiple communication devices are used as backup communication devices that transmit and receive the communication data between the server device and the automobile 1, and the communication between the main communication device and the server device is disconnected or deteriorated, the vehicle communication controller of the first automobile 71 can instantaneously switch the communication device that transmits and receives the communication data between the server device and the automobile 1 from the main communication device to the backup communication device. The vehicle communication controller of the first automobile 71 can select a main communication device and a backup communication device among the multiple communication devices periodically each time when the predetermined period has elapsed.

Moreover, when the communication between the main communication device and the server device is disconnected or deteriorated and the communication device that transmits and receives the communication data between the server device and the automobile 1 is to be switched from the main communication device to the backup communication device, the vehicle communication controller of the first automobile 71 can temporally stops the communication with the server device, and then switch the communication device, and after the switching, restart the communication with the server device.

Figure 6:
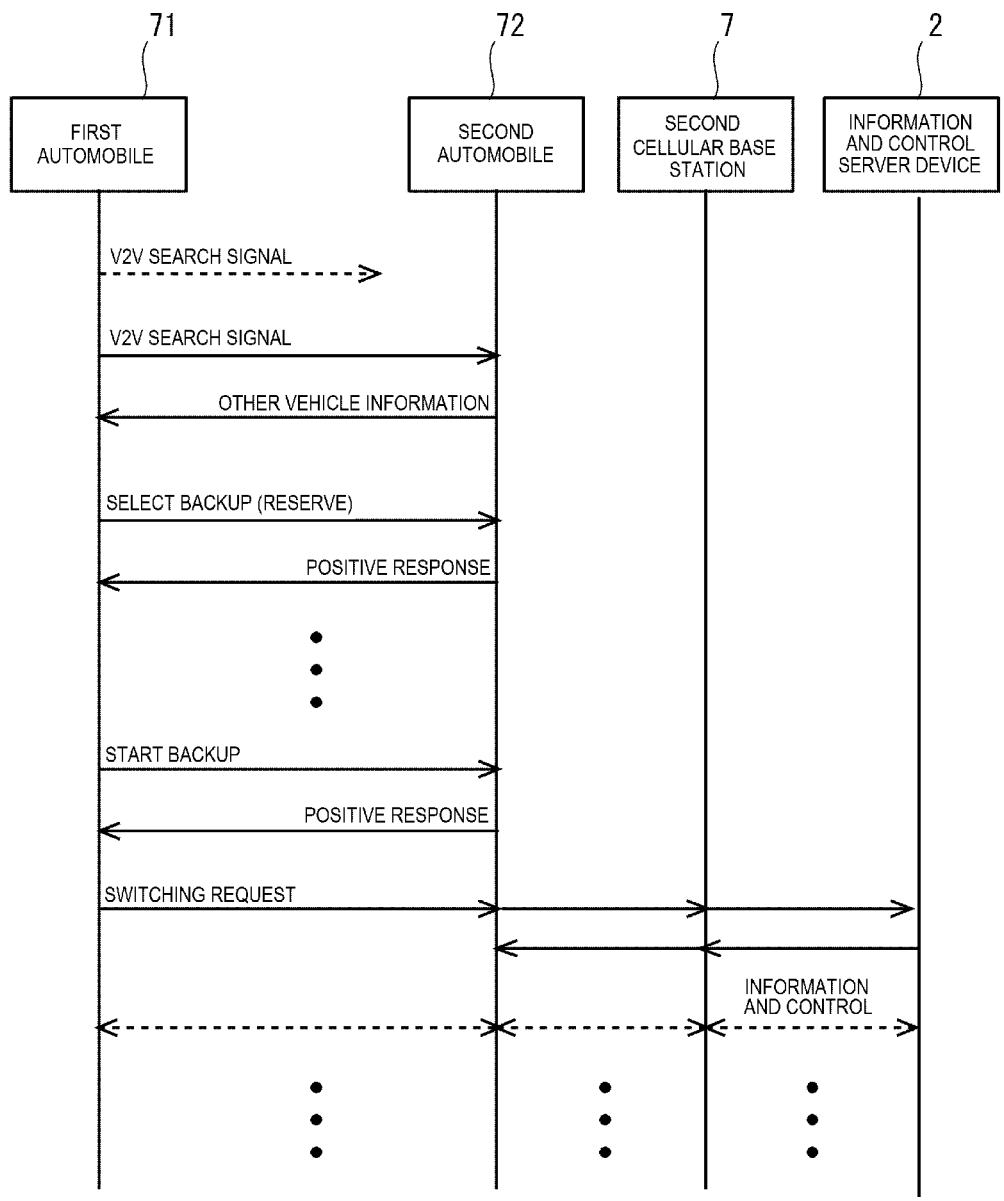
FIG. 6 is a sequence chart for explaining switching processing in which the first automobile causes a second automobile to perform alternative communication with the information and control server device, by the V2V (vehicle-to-vehicle) communication with the second automobile.

FIG. 6 is a sequence chart for explaining switching processing to alternative communication in which the first automobile 71 causes the second automobile 72 to perform alternative communication with the information and control server device 2, by the V2V communication with the second automobile 72.

FIG. 6 illustrates the first automobile 71, the second automobile 72, the second cellular base station 7 with which the second automobile 72 communicates, and the information and control server device 2. In the drawing, the processing flows from top to bottom.

When the vehicle communication controller of the first automobile 71 intends to establish a communication path by V2V communication with another vehicle such as the second automobile 72, the vehicle communication controller of the first automobile periodically outputs a V2V search signal from the V2V communication device 32 in order to search another vehicle that is communicable by the host vehicle.

Upon reception of the V2V search signal, the vehicle communication controller of another vehicle such as the second automobile 72 responds and transmits host vehicle information on the host vehicle from the V2V communication device 32 to the first automobile 71. This enables the vehicle communication controller of the first automobile 71 to confirm that another vehicle corresponding to V2V communication is present in the surrounding of the host vehicle.

Next, the vehicle communication controller of the first automobile 71 transmits a notification of backup selection from the V2V communication device 32 to the second automobile 72 having responded.

When the backup communication is available, the vehicle communication controller of the second automobile 72 reserves and secures communication resources of the host vehicle for the backup, and transmits an positive response indicating that the backup is possible from the V2V communication device 32 to the first automobile 71. This enables the vehicle communication controller of the first automobile 71 to know that the second automobile 72 has been able to reserve and prepare for the backup communication.

Upon the completion of the preprocessing in the foregoing, the second automobile 72 can start the alternative communication of communication data between the first automobile 71 and the information and control server device 2, using the communication path between the own cellular communication device 33 and the second cellular base station 7.

Thereafter, for example, the communication of the own cellular communication device 33, for example, serving as a main communication device, is interrupted or a serious loss occurs in the communication data, the vehicle communication controller of the first automobile 71 selects the V2V communication device 32 that is communicable with the second automobile 72 as a new main communication device, and transmits a switching request from the V2V communication device 32 serving as a new main communication device. The vehicle communication controller of the second automobile 72 sets, when the own V2V communication device 32 receives a switching request, routing configuration using communication resources of the V2V communication device 32 and the cellular communication device 33, and transmits the switching request from the own cellular communication device 33 to the second cellular base station 7. The switching request having been transmitted to the second cellular base station 7 is transmitted to information and control server device 2 through the Internet 12. Upon reception of the switching request, the information and control server device 2 transmits a response toward the second automobile 72, and switches a relay destination of the communication data with the first automobile 71 from the first communication network control device 5 in the first cellular communication network system 3 to the second communication network control device 8 in the second cellular communication network system 6.

This enables the first automobile 71 and the information and control server device 2 to transmit and receive communication data to be transmitted and received therebetween via the second automobile 72, the second cellular base station 7, the second communication network control device 8, and the Internet 12.

Figure 7:
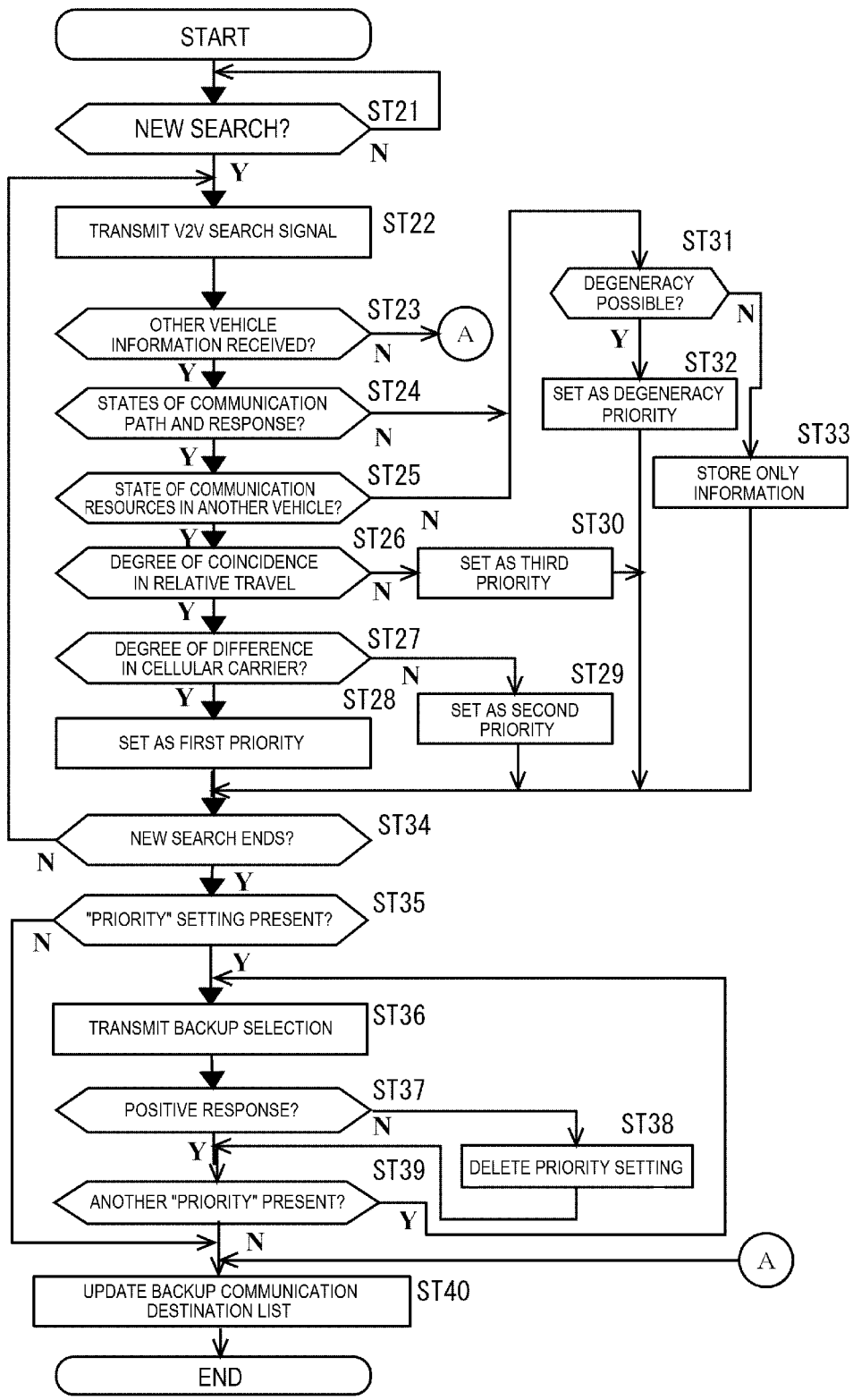
FIG. 7 is a flowchart of one example of V2V communication destination candidate selecting processing that is periodically executed in the first automobile that communicates with the information and control server device.

FIG. 7 is a flowchart of one example of V2V communication destination candidate selecting processing that is periodically executed in the first automobile 71 that communicates with the information and control server device 2.

The vehicle communication controller of the first automobile 71 repeatedly executes the processing in FIG. 7 during a period when the automobile 1 is being activated. Accordingly, even when a communication environment has changed with the travel of the first automobile 71, a candidate for a V2V communication destination of the first automobile 71 can be updated to the candidate in accordance with the communication environment having been changed.

At Step ST21, the vehicle communication controller of the first automobile 71 determines whether the communication destination of the V2V communication is newly searched. The vehicle communication controller determines that another automobile 1 that is communicable with the V2V communication device 32 is periodically searched for each predetermined period in which the travel environment of the host vehicle is assumed to be changed, for example.

At Step ST22, the vehicle communication controller of the first automobile 71 transmits a V2V search signal from the V2V communication device 32. The V2V communication device 32 of another vehicle having received the V2V search signal transmits a search response. The V2V communication device 32 of another vehicle may collect information such as information on communication resources and the use state thereof, the travel route, the travel direction, and the travel speed, the carrier, the communication method, and the use state of the cellular communication, and transmit the search response including the information.

At Step ST23, the vehicle communication controller of the first automobile 71 determines whether other vehicle information has been received from the V2V communication device 32 of another vehicle. If no other vehicle information has been received, the vehicle communication controller causes the processing to proceed to Step ST40. If other vehicle information has been received, the vehicle communication controller causes the processing to proceed to Step ST24.

At Step ST24, the vehicle communication controller of the first automobile 71 determines a state of a communication path with the V2V communication device 32 of another vehicle and a state of a response of the V2V communication device 32 by another vehicle, as a first determination condition. The vehicle communication controller may determine, for example, based on the information on the communication method of V2V and the frequency included in the search response, a state of a communication path with the V2V communication device 32 of another vehicle. Moreover, the vehicle communication controller may determine, based on the measurement time by the V2V timer 58 from when the V2V search signal is transmitted to when the search response is received, a state of a response of the V2V communication device 32 by another vehicle. If these satisfy the condition suitable for the backup communication, the vehicle communication controller determines that good backup communication with another vehicle is possible, and causes the processing to proceed to Step ST25. In other cases, the vehicle communication controller causes the processing to proceed to Step ST31.

At Step ST25, the vehicle communication controller of the first automobile 71 determines a state of communication resources for backup V2V communication in another vehicle, as a second determination condition. The vehicle communication controller determines, based on information on communication resources for V2V that is included in the search response, and a use statue thereof, for example, a state of the communication resources. The vehicle communication controller may further determine, based on information on a use state of cellular communication in another vehicle, a state of the communication resources. If this state satisfies the condition suitable for the backup communication, the vehicle communication controller determines that another vehicle is in a state in which good backup communication is possible, and causes the processing to proceed to Step ST26. In other cases, the vehicle communication controller causes the processing to proceed to Step ST31.

At Step ST26, the vehicle communication controller of the first automobile 71 determines the degree of coincidence in relative travel between the travel of another vehicle and the travel of the host vehicle, as a third condition. The vehicle communication controller compares the travel route, the travel direction, and the travel speed of another vehicle that are included in the search response, for example, with the travel route, the travel direction, and the travel speed of the host vehicle, and determines the degree of coincidence in the relative travel of those. When another vehicle travels on the same road as the host vehicle travels in the same direction, for example, the vehicle communication controller determines that the relative travels are coincident, and causes the processing to proceed to Step ST27. When another vehicle travels on the same road as the host vehicle travels in the reverse direction, for example, the vehicle communication controller determines that the travels are not coincident, and causes the processing to proceed to Step ST30. When the radio field intensity of the V2V communication transmitted by the second automobile 72 is strong, or the response time is short, the vehicle communication controller may determine that the second automobile 72 comes closer to the host vehicle, and the relative travels are incident.

At Step ST27, the vehicle communication controller of the first automobile 71 determines the degree of difference of the carrier of the cellular communication network system that the cellular communication device 33 of another vehicle uses, as a fourth determination condition. The vehicle communication controller compares information on the carrier and the communication method of the cellular communication included in the search response with the carrier and the communication method of the cellular communication device 33 of the host vehicle, for example, and determines the degree of difference in those. For example, when the carriers of the cellular communications are different from each other, or the different cellular base stations are used due to the different communication methods even in the same carrier, the vehicle communication controller determines that the carriers are different from each other, and causes the processing to proceed to Step ST28. Both of the carriers and the communication methods are the same, the vehicle communication controller determines that the carrier is not different, and causes the processing to proceed to Step ST29.

At Step ST28, the vehicle communication controller of the first automobile 71 sets the priority of another vehicle other vehicle information of which has been received, as a first priority, and records it in the control memory 44. The vehicle communication controller sets another vehicle that satisfies all the conditions from the first condition to the fourth condition as a first priority, which is the highest priority.

At Step ST29, the vehicle communication controller of the first automobile 71 sets the priority of another vehicle other vehicle information of which has been received, as a second priority, and records it in the control memory 44. The vehicle communication controller sets another vehicle that satisfies all the conditions from the first condition to the third condition as a second priority. The second priority is the priority that can be selected after the first priority is selected.

At Step ST30, the vehicle communication controller of the first automobile 71 sets the priority of another vehicle other vehicle information of which has been received, as a third priority, and records it in the control memory 44. The vehicle communication controller sets another vehicle that satisfies both of the first condition and the second condition as a third priority. The third priority is the priority that can be selected after the second priority is selected.

At Step ST31, the vehicle communication controller of the first automobile 71 determines whether degenerated communication of not all the communication data of the host vehicle but of only a part of communication data with the V2V communication device 32 of another vehicle is possible. The first automobile 71 may transmit and receive multiple types of communication data, such as communication data for entertainment and communication data for control including traffic information, for example. In this case, in the first automobile 71, such a situation can be generated that the degree of importance for each communication data is different, for example, loss of the communication data for entertainment may be acceptable but the communication data for control is not to be lost. In this case, the vehicle communication controller determines whether degenerated communication of not all the communication data of the host vehicle but of notable communication data for control is possible. If the backup communication in the degenerated state is possible, the vehicle communication controller causes the processing to proceed to Step ST32. In other cases, the vehicle communication controller causes the processing to proceed to Step ST33.

At Step ST32, the vehicle communication controller of the first automobile 71 sets the priority of another vehicle other vehicle information of which has been received, as a degeneracy priority, and records it in the control memory 44. The vehicle communication controller sets a part of the communication data that can be backed up between the server device and the first automobile 71 as a degeneracy priority with a lower priority than that from the first priority to lower than the third priority. The degeneracy priority is a low priority that can be selected after the first priority to the third priority in which all the communication data can be backed up.

At Step ST33, the vehicle communication controller of the first automobile 71 simply records and maintains the received other vehicle information in the control memory 44, without setting the priority of another vehicle other vehicle information of which has been received. In this case, another vehicle is not selected for the backup communication.

At Step ST34, the vehicle communication controller of the first automobile 71 determines whether a new search for a communication destination of the V2V communication is ended. For example, when the priority setting of the predetermined number has been obtained and a predetermined search period has elapsed, the vehicle communication controller determines that a new search is ended, and causes the processing to proceed to Step ST35. In other cases, the vehicle communication controller returns the processing to Step ST22, and further continues a new search.

With the processing in the foregoing, the vehicle communication controller of the first automobile 71 selects, based on the information that can be acquired by the host vehicle, a candidate for a communication destination for backup by the V2V communication. When multiple other vehicles are searched as other vehicles that are communicable by the V2V communication device 32, the vehicle communication controller determines the priority based on the communication quality for each of the other vehicles. The vehicle communication controller assigns a high priority to another vehicle in which the high-quality communication that is the most suitable for the host vehicle is possible. Such another vehicle is selected in the backup communication, together with the V2V communication device 32 for the backup communication. Next, the vehicle communication controller of the first automobile 71 checks whether the communication for backup is possible with respect to a communication destination in the V2V communication.

At Step ST35, the vehicle communication controller of the first automobile 71 determines, based on the V2V communication destination list 62 recorded in the control memory 44, a communication destination with "priority" being set is included in the communication destination list. If no communication destination with "priority" being set is included in the communication destination list, the vehicle communication controller causes the processing to proceed to Step ST40. If a communication destination with "priority"

being set is included, the vehicle communication controller causes the processing to proceed to Step ST36.

At Step ST36, the vehicle communication controller of the first automobile 71 transmits a candidate for a communication destination for backup having been selected, with respect to the V2V communication device 32 of another vehicle with "priority" being set in the communication destination list, from the V2V communication device 32. The vehicle communication controller may transmit a notification of backup selection with respect to the V2V communication device 32 of another vehicle with the highest priority. When the V2V communication device 32 of another vehicle receives a notification of backup selection, the vehicle communication controller thereof, determines the margin of resources and the like in the host vehicle, and transmits a positive response or a refusal response from the V2V communication device 32.

At Step ST37, the vehicle communication controller of the first automobile 71 determines whether a positive response is transmitted from a communication destination to which a notification of the selection of the candidate for backup has been made. If the vehicle communication controller has received the positive response, the vehicle communication controller causes the processing to proceed to Step ST39. If the vehicle communication controller has received no positive response, the vehicle communication controller causes the processing to proceed to Step ST38.

At Step ST38, the vehicle communication controller of the first automobile 71 deletes the "priority" setting for another vehicle to which a notification of the selection of the candidate for backup has been made, from the communication destination list. Accordingly, another vehicle with "priority" having been set is not selected as a communication destination for backup by the V2V communication.

At Step ST39, the vehicle communication controller of the first automobile 71 determines another communication destination with "priority" being set is remaining in the communication destination list. If another communication destination with "priority" being set is remaining in the communication destination list, the vehicle communication controller returns the processing to Step ST36. If no communication destination with "priority" being set is remaining in the communication destination list, the vehicle communication controller causes the processing to proceed to Step ST40.

At Step ST40, the vehicle communication controller of the first automobile 71 updates, based on the updated V2V communication destination list 62, a backup communication destination list 63 that is available for the communication between the first automobile 71 and the information and control server device 2.

FIGS. 8A and 8B are diagrams of examples of the V2V communication destination list 62 and the backup communication destination list 63, which are generated in the first automobile 71 by the processing in FIG. 7.

FIG. 8A is the V2V communication destination list 62 the first automobile 71 can use. The vehicle communication controller generates and records the V2V communication destination list 62 in FIG. 8A in the control memory 44, by the processes up to Step ST34 in FIG. 7. In the V2V communication destination list 62, for every V2V communication destination, identification information on the automobile 1 in a communication destination, the priority, and channel information on a channel with the communication destination are recorded. Moreover, if the vehicle communication controller has received a refusal response in the processes at Step ST35 and subsequent Steps in FIG. 7 from the communication destination, the vehicle communication controller updates information on the priority in FIG. 8A to NG. The priority of the communication destination with no priority being set is indicated as "–".

In the processing in FIG. 7, the priority is individually determined for each of the other automobiles 1. In this case, the multiple other automobiles 1 may be registered in each priority. When the multiple other automobiles 1 are registered in the same priority, the vehicle communication controller may select one with the strong radio field intensity of the V2V communication transmitted by each of the other automobiles 1 or with a short response time, and delete or downgrade the priority of the multiple other automobiles 1 other than the selected one. When the radio field intensity of the V2V communication to be received is strong or the response time is short, it is considered that the other automobile 1 having transmitted it may come closer to the first automobile 71 than the other automobiles 1 other than the other automobile 1, and the communication may highly probably become more stable.

FIG. 8B illustrates the backup communication destination list 63 that is available by the first automobile 71 for backup communication with the information and control server device 2. In the communication destination list, together with the backup communication device available for the backup communication, the main communication device that is currently used is also registered. The vehicle communication controller updates the backup communication destination list 63, based on the V2V communication destination list 62 in FIG. 8A, at Step ST40 in FIG. 7. Accordingly, the information on the automobile 1 that is registered in the backup communication destination list 63 and serves as a communication destination is periodically updated in accordance with the communication environment and the like. In the backup communication destination list 63 in FIG. 8B, the multiple automobiles 1 with the priority being set in the V2V communication destination list 62 in FIG. 8A are registered as communication destinations.

Figure 9:
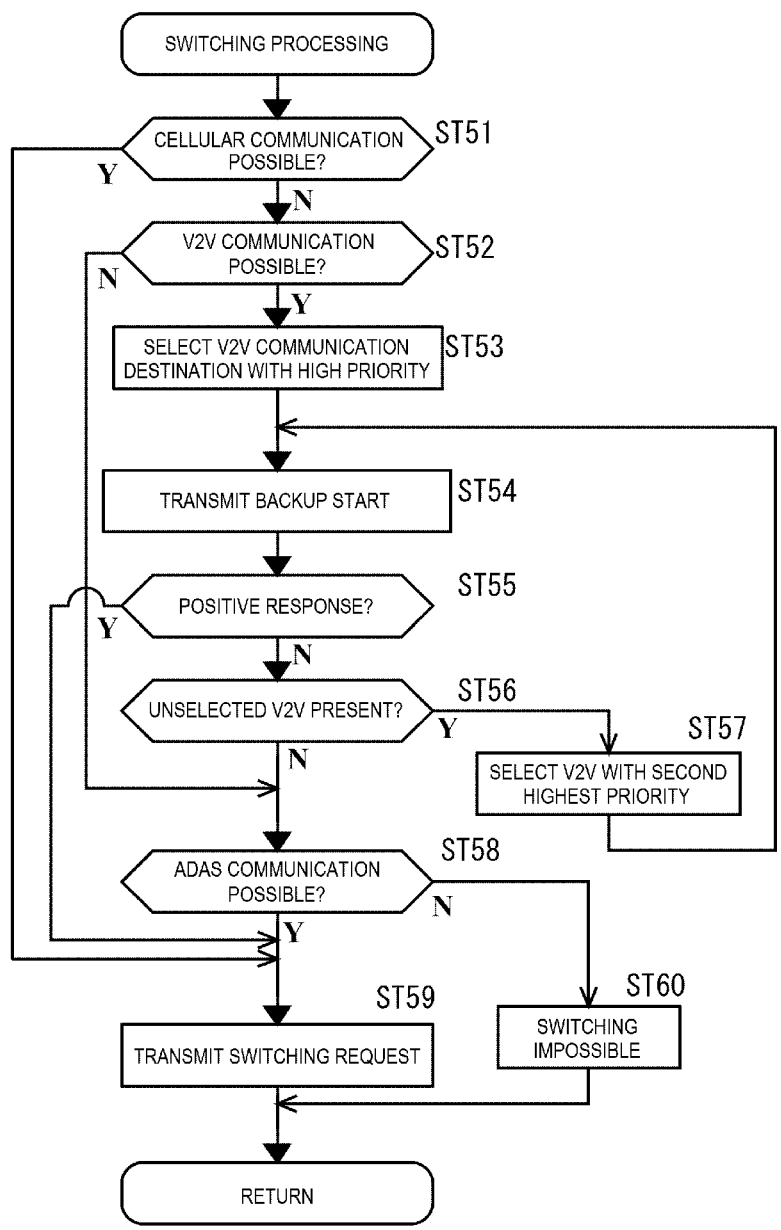
FIG. 9 is a flowchart of one example of detailed switching processing of a communication destination.

FIG. 9 is a flowchart of one example of detailed switching processing of a communication destination.

When the vehicle communication controller of the first automobile 71 intends to switch a communication device to be used in the communication between the first automobile 71 and the information and control server device 2 at Step ST12 in FIG. 5 and the like, the vehicle communication controller of the first automobile 71 executes the processing in FIG. 9. In FIG. 5, for example, when the main communication is interrupted, when a serious loss of communication data is generated in the main communication, and when a predetermined period has elapsed, based on the backup communication destination list 63 in FIG. 8B, switching of the communication device is attempted by the switching processing of a communication destination in FIG. 9.

At Step ST51, the vehicle communication controller of the first automobile 71 determines whether the cellular communication is possible. If the cellular communication is possible, the vehicle communication controller selects the cellular communication device 33 as a new main communication device, and causes the processing to proceed to Step ST59. If the cellular communication is impossible, the vehicle communication controller causes the processing to proceed to Step ST52.

At Step ST52, the vehicle communication controller of the first automobile 71 determines whether the V2V communication is possible. When the automobile 1 is registered in the backup communication destination list 63, the vehicle communication controller determines that the V2V communication is possible, and causes the processing to proceed to Step ST53. When the automobile 1 is not registered in the backup communication destination list 63, the vehicle communication controller determines that the V2V communication is impossible, and causes the processing to proceed to Step ST58.

At Step ST53, the vehicle communication controller of the first automobile 71 selects a V2V communication destination with a high priority. The vehicle communication controller selects the automobile 1 with the highest priority in the backup communication destination list 63 as a V2V communication destination.

At Step ST54, the vehicle communication controller of the first automobile 71 transmits a notification of backup start to the selected V2V communication destination. When the V2V communication device 32 of another vehicle receives the notification of backup start, the vehicle communication controller thereof determines the margin of resources and the like in the host vehicle at the time point, and transmits a positive response or a refusal response from the V2V communication device 32.

At Step ST55, the vehicle communication controller of the first automobile 71 determines whether a positive response is transmitted from the communication destination to which the notification of backup start has been made. If the vehicle communication controller has received the positive response, the vehicle communication controller causes the processing to proceed to Step ST59. If the vehicle communication controller has received no positive response, the vehicle communication controller causes the processing to proceed to Step ST56.

At Step ST56, the vehicle communication controller of the first automobile 71 determines the presence or absence of an unselected V2V communication destination. If an unselected V2V communication destination is remaining in the backup communication destination list 63, the vehicle communication controller causes the processing to proceed to Step ST57. If no unselected V2V communication destination is remaining in the backup communication destination list 63, the vehicle communication controller causes the processing to proceed to Step ST58.

At Step ST57, the vehicle communication controller of the first automobile 71 selects a V2V communication destination with the second highest priority, among the unselected V2V communication destinations. Thereafter, the vehicle communication controller returns the processing to Step ST54. Accordingly, the vehicle communication controller attempts to start backup with respect to the V2V communication destination with the second highest priority.

At Step ST58, the vehicle communication controller of the first automobile 71 determines whether the ADAS communication is possible. If the ADAS communication is possible, the vehicle communication controller selects the ADAS communication device 34 as a new main communication device, and causes the processing to proceed to Step ST59. If the ADAS communication is impossible, the vehicle communication controller causes the processing to proceed to Step ST60.

At Step ST59, the vehicle communication controller of the first automobile 71 transmits a switching request for the backup communication from the new main communication device having been selected as the communication being possible, and ends the processing in FIG. 9. The new main communication device is not necessarily different from the previous main communication device, but the same communication device can continuously be selected as a main communication device. Accordingly, the communication between the first automobile 71 and the information and control server device 2 is continued using the new main communication device.

At Step ST60, the vehicle communication controller of the first automobile 71 outputs a notification of switching impossible indicating that switching to the backup communication is impossible to the network 35 of the first automobile 71, and ends the processing in FIG. 9. The control device that is coupled to the network 35 in the first automobile 71 acquires the notification of switching impossible, and executes the control.

In this manner, when switching to the V2V communication device 32 having served as a backup communication device is executed, the vehicle communication controller selects a communication destination of the V2V communication device 32 based on the priority. The vehicle communication controller selects a communication destination of the V2V communication device 32 in the order of the first priority, the second priority, and the third priority.

Moreover, the vehicle communication controller selects the cellular communication device 33 as a main communication device in priority to the V2V communication device 32 and the ADAS communication device 34 for the intelligent transport system. Moreover, the vehicle communication controller selects the V2V communication device 32 as a backup communication device in priority to the ADAS communication device 34 for the intelligent transport system. The vehicle communication controller sets the V2V communication device 32 as a backup communication device in priority to the communication devices other than the V2V communication device 32 among the multiple communication devices. Therefore, when the communication between the main communication device and the server device is disconnected or deteriorated, the vehicle communication controller can switch the communication device that transmits and receives communication data between the server device and the automobile 1 from the main communication device to the V2V communication device 32 serving as a backup communication device. When the communication by the cellular communication device 33 serving as a main communication device is impossible, the vehicle communication controller can immediately switch the communication to the backup communication by the V2V communication device 32 having been confirmed to be communicable in advance, and receive communication data so as not to be interrupted.

Figure 10:
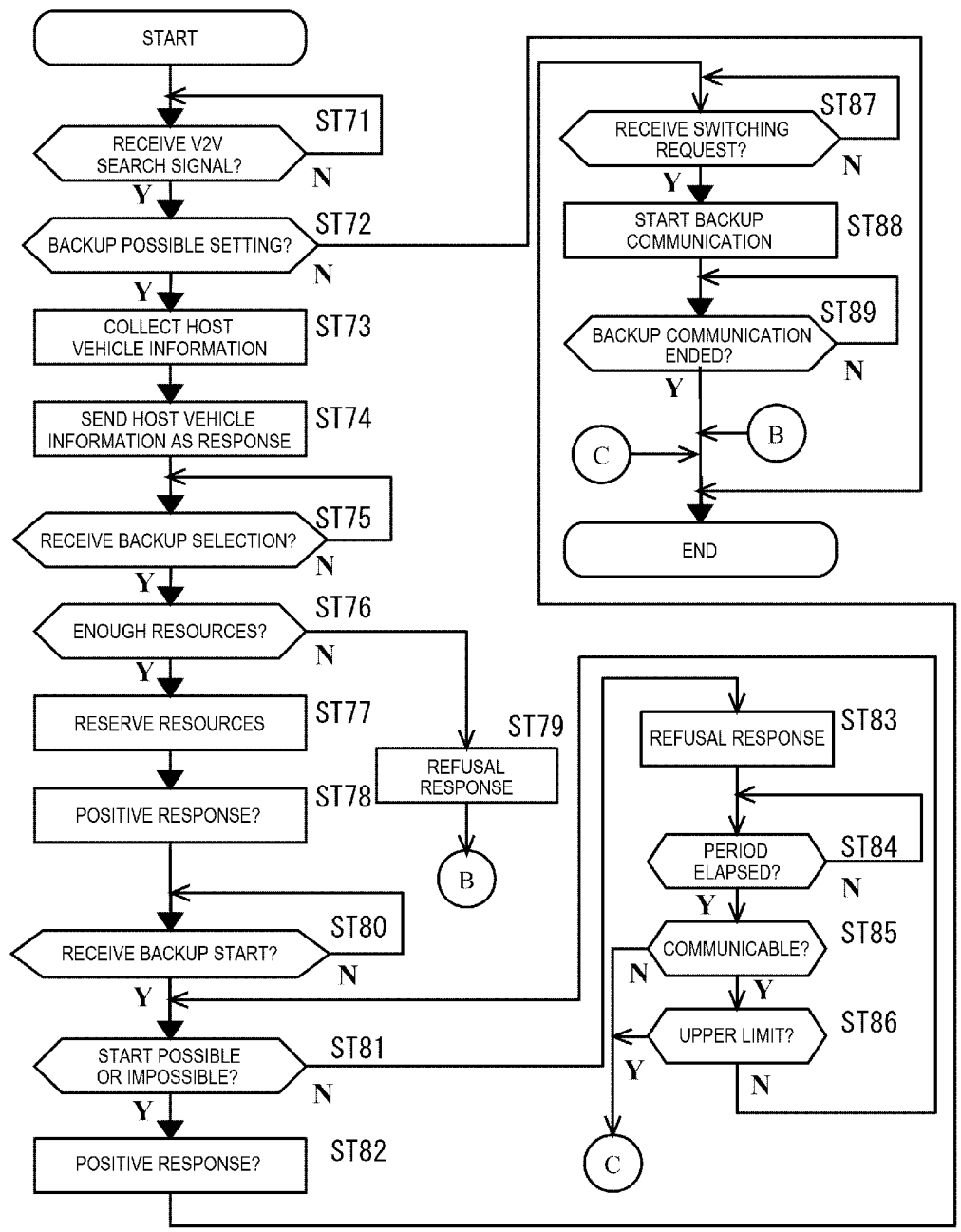
FIG. 10 is a flowchart of one example of processing to be executed in the second automobile that performs alternative communication, before the alternative communication is started.

FIG. 10 is a flowchart of one example of processing to be executed in the second automobile 72 that performs alternative communication, before the alternative communication is started.

When the second automobile 72 is being activated, the vehicle communication controller of the second automobile 72 repeatedly executes alternative communication processing in FIG. 10 using the V2V communication device 32 of the host vehicle.

At Step ST71, the vehicle communication controller of the second automobile 72 determines whether the V2V communication device 32 of the host vehicle has received a V2V search signal. If the V2V communication device 32 of the host vehicle has received no V2V search signal, the vehicle communication controller repeats the process at Step ST71. If the V2V communication device 32 of the host vehicle has received a V2V search signal, the vehicle communication controller causes the processing to proceed to Step ST72.

At Step ST72, the vehicle communication controller of the second automobile 72 determines whether the setting for the host vehicle is as a backup possible setting. If it is not a backup possible setting, the vehicle communication controller ends the processing in FIG. 10. If it is a backup possible setting, the vehicle communication controller causes the processing to proceed to Step ST73.

At Step ST73, the vehicle communication controller of the second automobile 72 collects information for the backup communication of the host vehicle. The vehicle communication controller collects, for example, information on communication resources, a use status thereof, a prediction of a future use status thereof, the presence or absence of the reservation of backup for another automobile 1, the travel route, the travel direction, and the travel speed, and information on a communication path such as a carrier, a communication method, a band, and a use status of the cellular communication.

At Step ST74, the vehicle communication controller of the second automobile 72 transmits a search response from the V2V communication device 32. The search response includes the collected host vehicle information.

The vehicle communication controller of the second automobile 72 responds information on the host vehicle, when the V2V communication device 32 of the host vehicle has received a search signal from the first automobile 71 that is another automobile 1.

Moreover, the vehicle communication controller responds information on the cellular communication device 33 as information on a communication path of the communication device other than the V2V communication device 32.

At Step ST75, the vehicle communication controller of the second automobile 72 determines whether the V2V communication device 32 of the host vehicle has received a notification of backup selection. If the V2V communication device 32 of the host vehicle has received no notification of backup selection, the vehicle communication controller repeats the process at Step ST75. If the V2V communication device 32 of the host vehicle has received a notification of backup selection, the vehicle communication controller causes the processing to proceed to Step ST76.

At Step ST76, the vehicle communication controller of the second automobile 72 determines whether the backup communication serving as alternative communication is possible about the communication resources and the like at the current time point. If the communication resources at the current time point have no margin, the vehicle communication controller causes the processing to proceed to Step ST79.

If the communication resources at the current time point have a margin, the vehicle communication controller causes the processing to proceed to Step ST77. The vehicle communication controller may determine a margin about not only s state of the communication device but also a state of a power supply, for example. When the power supply condition is not sound, it is better not to start the alternative communication.

At Step ST77, the vehicle communication controller of the second automobile 72 reserves communication resources of the V2V memory 60 of the V2V communication device 32 in the host vehicle for the backup communication. The vehicle communication controller secures, for example, a memory area to be used for the backup communication serving as alternative communication, in the V2V memory 60 and the cellular memory 49. The vehicle communication controller causes the V2V ECU 59 and the cellular ECU 48 to mutually input and output the received communication data.

At Step ST78, the vehicle communication controller of the second automobile 72 transmits a positive response about the backup selection from the V2V communication device 32.

At Step ST79, the vehicle communication controller of the second automobile 72 transmits a refusal response about the backup selection from the V2V communication device 32. Thereafter vehicle communication controller ends the processing in FIG. 10.

At Step ST80, the vehicle communication controller of the second automobile 72 determines whether the V2V communication device 32 of the host vehicle has received a notification of backup start. If the V2V communication device 32 of the host vehicle has received no notification of backup start, the vehicle communication controller repeats the process at Step ST80. If the V2V communication device 32 of the host vehicle has received a notification of backup start, the vehicle communication controller causes the processing to proceed to Step ST81.

At Step ST81, the vehicle communication controller of the second automobile 72 determines whether the start of the backup communication for the alternative communication is possible based on the state at the current time point. If the communication resources at the current time point have no margin and if communication resources have been unable to be secured, the vehicle communication controller causes the processing to proceed to Step ST83. If the communication resources have been secured and a preparation for the alternative communication has been completed, the vehicle communication controller causes the processing to proceed to Step ST82.

At Step ST82, the vehicle communication controller of the second automobile 72 transmits a positive response about the backup start from the V2V communication device 32.

At Step ST83, the vehicle communication controller of the second automobile 72 transmits a refusal response about the backup start from the V2V communication device 32.

The vehicle communication controller of the second automobile 72 transmits, when the V2V communication device 32 of the host vehicle has received a notification of backup start from the first automobile 71 that is another automobile 1, a positive or refusal response in accordance with the status of the host vehicle.

For example, it is assumed that the first determination condition includes a setting in which the V2V communication device 32 of the host vehicle is unavailable as a backup device, the second determination condition includes a condition that a shortage or a prediction of the shortage in communication resources of the host vehicle, and the third determination condition includes a condition that the backup for another automobile 1 has already been made. When the host vehicle meets none of the first determination condition to the third determination condition, the vehicle communication controller transmits a positive response to the notification of backup start; otherwise, transmits a refusal response.

At Step ST84, the vehicle communication controller of the second automobile 72 determines whether a predetermined period has elapsed after the refusal response was made. If the time that is measured from the timing of the refusal response by the control timer 42 does not exceed the predetermined period, the vehicle communication controller repeats the process at Step ST84. If the predetermined period has elapsed, the vehicle communication controller causes the processing to proceed to Step ST85.

At Step ST85, the vehicle communication controller of the second automobile 72 determines whether the V2V communication device 32 of the first automobile 71 is in a communicable state. When the vehicle communication controller attempts the communication from the V2V communication device 32 of the host vehicle to the V2V communication device 32 of the first automobile 71, for example, and acquires an instantaneous response, the vehicle communication controller determines that the V2V communication device 32 of the first automobile 71 is in a communicable state, and causes the processing to proceed to Step ST86. If the vehicle communication controller acquires no instantaneous response, the vehicle communication controller ends the processing in FIG. 10.

At Step ST86, the vehicle communication controller of the second automobile 72 determines whether the number of checks after the refusal response has exceeded the upper limit. The upper limit may be several counts, for example. If the number of checks has exceeded the upper limit, the vehicle communication controller ends the processing in FIG. 10. If the number of checks does not exceed the upper limit, the vehicle communication controller returns the processing to Step ST81. If the margin status of communication resources at the current time point changes, the vehicle communication controller can determine that the start is possible at Step ST81, and transmit a positive response.

In this manner, after having made a refusal response to a notification of backup start, the vehicle communication controller can re-determine the status of the host vehicle every time when a predetermined period has elapsed, and can respond again a positive response when the host vehicle corresponds none of the first determination condition to the third determination condition.

When the time has elapsed and the state of the host vehicle and the communication environment have changed, it is possible to give a permission to the first automobile 71 having made a request of backup start in priority to the other automobiles 1. Moreover, it is possible to reduce a period when the communication resources of the host vehicle are not reserved, and efficiently open the communication resources of the host vehicle.

At Step ST87, the vehicle communication controller of the second automobile 72 determines whether the V2V communication device 32 of the host vehicle has received a switching request. If the V2V communication device 32 of the host vehicle has received no switching request, the vehicle communication controller repeats the process at Step ST87. If the V2V communication device 32 of the host vehicle has received a switching request, the vehicle communication controller causes the processing to proceed to Step ST88.

At Step ST88, the vehicle communication controller of the second automobile 72 starts the backup communication of the first automobile 71. The V2V communication device 32 of the second automobile 72 transmits and receives communication data with the V2V communication device 32 of the first automobile 71. The cellular communication device 33 of the second automobile 72 transmits and receives communication data with the second cellular base station 7 of the carrier with which the host vehicle signs up. The V2V ECU 59 and the cellular ECU 48 of the second automobile 72 mutually input and output the received communication data. Accordingly, the communication data transmitted by the first automobile 71 from the V2V communication device 32 is transmitted via the V2V communication device 32 of the second automobile 72, the cellular communication device 33 serving as a first communication device, the second cellular base station 7, and the Internet 12, to the information and control server device 2. Moreover, communication data to be transmitted by the information and control server device 2 is transmitted through the Internet 12, the second cellular base station 7, the cellular communication device 33 serving as a first communication device of the second automobile 72, and the V2V communication device 32, to the V2V communication device 32 of the first automobile 71.

Accordingly, the first automobile 71 can continuously transmit and receive, using the alternative communication by the V2V communication, the communication data having been communicated with the information and control server device 2 using the own cellular communication device 33.

When the V2V communication device 32 of the second automobile 72 has received a switching request from the first automobile 71 that is another automobile 1, the second automobile 72 starts transmission and reception of communication data between the first automobile 71 and the information and control server device 2 by the alternative communication.

At Step ST89, the vehicle communication controller of the second automobile 72 determines whether the backup communication of the first automobile 71 ends. In a case where the V2V communication device 32 of the first automobile 71 is not used in the communication between the first automobile 71 and the information and control server device 2 as a result of the switching processing at Step ST12 in FIG. 5, for example, based on an end request from the V2V communication device 32 of the first automobile 71, the vehicle communication controller of the second automobile 72 determines that the backup communication serving as alternative communication ends. If the vehicle communication controller has received no end request, the vehicle communication controller repeats the determination process at Step ST89. If the vehicle communication controller has determined that the backup communication ends, the vehicle communication controller ends the processing in FIG. 10.

The vehicle communication control device 30 of the second automobile 72 can execute the alternative communication with high reliability, by executing the backup communication for the alternative communication with the procedure in FIG. 10.

Moreover, the vehicle communication control device 30 of the second automobile 72 can make an influence to the control of the host vehicle difficult to occur, by determining the propriety of the backup as a contract side to which the backup is requested. Moreover, a user of the second automobile 72 can prevent the backup by the setting. The user can ignore and substantially reject the demand when a request side of the backup does not follow the procedure corresponding to that in FIG. 10. multiple requests of backup are not accepted to make the communication resources of the host vehicle difficult to be tight and be short. Moreover, it is possible to prevent multiple backup selections from multiplex booking before knowing.

As in the foregoing, in the present embodiment, multiple communication devices that transmit and receive communication data between the information and control server device 2 and the first automobile 71 via mutually different communication paths are provided in the first automobile 71. Further, the vehicle communication controller that controls the communication by the multiple communication devices sets a part of the multiple communication devices as a main communication device that transmits and receives the communication data between the information and control server device 2 and the first automobile 71, and sets apart of the remaining multiple communication devices as a backup communication device that transmits and receives the communication data between the information and control server device 2 and the first automobile 71. Therefore, in the present embodiment, when the communication between the main communication device and the server device is disconnected or deteriorated, the vehicle communication controller can switch the communication device that transmits and receives communication data between the information and control server device 2 and the first automobile 71 from the main communication device to the backup communication device. With the communication by the backup communication device, the communication data between the information and control server device 2 and the first automobile 71 can be continued.

In this manner, in the present embodiment, the communication does not depend on the communication by one communication device, so that the communication data is difficult to fail to be received due to the interruption and the loss of the communication data during the movement.

Moreover, in the present embodiment, multiple communication devices that transmit and receive communication data between the information and control server device 2 and the second automobile 72 via mutually different communication paths are provided in the second automobile 72. Further, the vehicle communication controller that controls the communication by the multiple communication devices transmits, when the V2V communication device 32 is requested to acquire communication data between the information and control server device 2 and the first automobile 71, from the first automobile 71, as a backup communication device for the alternative communication, communication data received by the own cellular communication device 33 from the information and control server device 2, from the own V2V communication device 32 to the first automobile 71, and transmits communication data received by the own V2V communication device 32 from the first automobile 71, from the cellular communication device 33 serving as a first communication device to the information and control server device 2. Therefore, the second automobile 72 can relay communication data between the information and control server device 2 and the first automobile 71 in order to back up the communication of the first automobile 71. The second automobile 72 can be expected to provide the stable communication by the V2V communication over long time.

In particular, in the present embodiment, the communication between the first automobile 71 and the second automobile 72 is executed by the V2V communication. The first automobile 71 and the second automobile 72 highly probably travel, for example, on the same road, so as to come closer to the extent that allows the V2V communication. In the V2V communication, the communication is difficult to cut off due to the structural object in the surrounding of the road. The V2V communication is different from the cellular communication and the like in the way of change in communication environment during the movement, if compared. Therefore, it can be expected that the V2V communication can provide more stable communication even in a place where the communication is difficult to be maintained, than the cellular communication.

In this manner in the present embodiment, with the alternative communication by the V2V communication by the second automobile 72, it possible to effectively prevent the first automobile 71 from failing to use the communication data, due to the loss of the communication data and the interruption of the communication data that is transmitted and received with the information and control server device 2.

The embodiment in the foregoing is an example of the disclosure. It is noted that the disclosure is not limited to the embodiment. Various modifications and changes may be made to the embodiments without departing from the sprit and scope of the disclosure.

The invention claimed is:

1. An external communication system for a vehicle, the system comprising:
multiple communication devices provided in the vehicle, the multiple communication devices being configured to transmit and receive communication data between a server device and the vehicle via mutually different communication paths; and
a controller configured to control communication by the multiple communication devices, wherein the controller is configured to
set at least one of the multiple communication devices as a main communication device to transmit and receive the communication data between the server device and the vehicle, and
set at least one of the remaining multiple communication devices as a backup communication device to transmit and receive the communication data between the server device and the vehicle, and
wherein when communication between the main communication device and the server device is disconnected or deteriorated, the controller
switches from the main communication device to the backup communication device after temporarily stopping the communication with the server device, and
restarts the communication with the server device after the switching.

2. The external communication system according to claim 1, wherein
the multiple communication devices comprise an inter-vehicle communication device, and
the controller sets the inter-vehicle communication device as the backup communication device in priority to the multiple communication devices other than the inter-vehicle communication device among the multiple communication devices.

3. The external communication system according to claim 2, wherein
when multiple vehicles are searched as other vehicles with which the inter-vehicle communication device is communicable, the controller determines a priority based on a communication quality for each of the other vehicles, and
when the main communication device is switched to the inter-vehicle communication device serving as the backup communication device, the controller selects a communication destination of the inter-vehicle communication device based on the priorities.

4. The external communication system according to claim 3, wherein
when the multiple vehicles are searched as the other vehicles with which the inter-vehicle communication device is communicable, the controller determines the priority based on the communication quality for each of the other vehicles and makes a notification, and
when the other vehicles send positive responses to the notification, the controller sets the priorities.

5. The external communication system according to claim 3, wherein the controller determines respective priorities for the other vehicles in accordance with at least one of the followings as the communication qualities:
(i) states of the communication paths between the inter-vehicle communication device and the other vehicles,
(ii) states of responses from the other vehicles,
(iii) states of communication resources of the other vehicles,
(iv) degrees of coincidence in relative travel with the other vehicles, or
(v) degrees of difference of other communication paths that the other vehicles use.

6. The external communication system according to claim 5, wherein
a first determination condition comprises the states of the communication paths with the other vehicles and the states of the responses from the other vehicles,
a second determination condition comprises the states of the communication resources of the other vehicles,
a third determination condition comprises the degrees of coincidence in relative travel with the other vehicles,
a fourth determination condition comprises the degrees of difference of the other communication paths that the other vehicles use,
the controller determines another vehicle that meets the first determination condition to the fourth determination condition, as a first priority,
the controller determines another vehicle that meets the first determination condition to the third determination condition, as a second priority,
the controller determines another vehicle that meets the first determination condition to the second determination condition, as a third priority, and
when the main communication device is switched to the inter-vehicle communication device serving as the backup communication device, the controller selects a communication destination of the inter-vehicle communication device in order of the first priority, the second priority, and the third priority.

7. The external communication system according to claim 3, wherein
the controller determines, as a high priority, another vehicle that can back up all of the communication data between the server device and the vehicle, and
the controller determines, as a low priority, another vehicle that can back up a part of the communication data between the server device and the vehicle, the low priority indicating the backup is possible in a degenerated state.

8. The external communication system according to claim 2, wherein the controller periodically selects the main communication device and the backup communication device, from the multiple communication devices.

9. The external communication system according to claim 2, wherein
the multiple communication devices comprise a cellular communication device, the inter-vehicle communication device, and a communication device for an intelligent transport system,
the controller sets the cellular communication device as the main communication device in priority to the inter-vehicle communication device and the communication device for an intelligent transport system, and
the controller sets the inter-vehicle communication device as the backup communication device in priority to the communication device for an intelligent transport system.

10. The external communication system according to claim 2, wherein when multiple vehicles are searched as other vehicles with which the inter-vehicle communication device is communicable, the controller
determines a communication quality for each of the other vehicles, and
selects, among the other vehicles, another vehicle that can communicate with high quality as the backup communication device together with the inter-vehicle communication device.

11. The external communication system according to claim 10, wherein
when multiple vehicles are searched as other vehicles with which the inter-vehicle communication device is communicable, the controller determines a priority based on the communication quality for each of the other vehicles, and
when the main communication device is switched to the inter-vehicle communication device serving as the backup communication device, the controller selects a communication destination of the inter-vehicle communication device based on the priorities.

12. The external communication system according to claim 11, wherein
when the multiple vehicles are searched as the other vehicles with which the inter-vehicle communication device is communicable, the controller determines the priority based on the communication quality for each of the other vehicles and makes a notification, and
when the other vehicles send positive responses to the notification, the controller sets the priorities.

13. The external communication system according to claim 10, wherein the controller determines respective priorities for the other vehicles in accordance with at least one of the followings as the communication qualities:
(i) states of the communication paths between the inter-vehicle communication device and the other vehicles,
(ii) states of responses from the other vehicles,
(iii) states of communication resources of the other vehicles,
(iv) degrees of coincidence in relative travel with the other vehicles, or
(v) degrees of difference of other communication paths that the other vehicles use.

14. The external communication system according to claim 13, wherein
a first determination condition comprises the states of the communication paths with the other vehicles and the states of the responses from the other vehicles,
a second determination condition comprises the states of the communication resources of the other vehicles,
a third determination condition comprises the degrees of coincidence in relative travel with the other vehicles,
a fourth determination condition comprises the degrees of difference of the other communication paths that the other vehicles use,
the controller determines another vehicle that meets the first determination condition to the fourth determination condition, as a first priority,
the controller determines another vehicle that meets the first determination condition to the third determination condition, as a second priority, the controller determines another vehicle that meets the first determination condition to the second determination condition, as a third priority, and when the main communication device is switched to the inter-vehicle communication device serving as the backup communication device, the controller selects a communication destination of the inter-vehicle communication device in order of the first priority, the second priority, and the third priority.

15. The external communication system according to claim 10, wherein
the controller determines, as a high priority, another vehicle that can back up all of the communication data between the server device and the vehicle, and
the controller determines, as a low priority, another vehicle that can back up a part of the communication data between the server device and the vehicle, the low priority indicating the backup is possible in a degenerated state.

16. The external communication system according to claim 1, wherein the controller periodically selects the main communication device and the backup communication device, from the multiple communication devices.

17. The external communication system according to claim 1, wherein
the multiple communication devices comprise a cellular communication device, an inter-vehicle communication device, and a communication device for an intelligent transport system,
the controller sets the cellular communication device as the main communication device in priority to the inter-vehicle communication device and the communication device for an intelligent transport system, and
the controller sets the inter-vehicle communication device as the backup communication device in priority to the communication device for an intelligent transport system.

18. An external communication system for a vehicle, the system comprising:
a first communication device provided in the vehicle, the first communication device being configured to transmit and receive communication data between a server device and the vehicle via a first communication path;
a second communication device provided in the vehicle, the second communication device being configured to transmit and receive the communication data between the server device and the vehicle via a second communication path, the second communication device being an inter-vehicle communication device, the second communication path being different from the first communication path; and
a controller configured to:
set the first communication device as a main communication device to transmit and receive the communication data between the server device and the vehicle via the first communication path; and
set the second communication device as a backup communication device to transmit and receive the communication data between the server device and the vehicle via a second communication path,
wherein when multiple vehicles are searched as other vehicles with which the backup communication device transmits and receives the communication data between the server device and the vehicle, the controller determines a communication quality for each of the other vehicles, determines a priority based on the communication quality for each of the other vehicles, and generate a notification,
wherein when the other vehicles send positive responses to the notification, the controller sets the priorities, and
wherein when the main communication device is switched to the inter-vehicle communication device serving as the backup communication device, the controller selects a communication destination of the inter-vehicle communication device based on the priorities.

19. An external communication system for a vehicle, the system comprising:
a first communication device provided in the vehicle, the first communication device being configured to transmit and receive communication data between a server device and the vehicle via a first communication path;
a second communication device provided in the vehicle, the second communication device being configured to transmit and receive the communication data between the server device and the vehicle via a second communication path, the second communication device being an inter-vehicle communication device, the second communication path being different from the first communication path; and
a controller configured to:
set the first communication device as a main communication device to transmit and receive the communication data between the server device and the vehicle via the first communication path; and
set the second communication device as a backup communication device to transmit and receive the communication data between the server device and the vehicle via a second communication path,
wherein when multiple vehicles are searched as other vehicles with which the backup communication device transmits and receives the communication data between the server device and the vehicle, the controller:
determines a communication quality for each of the other vehicles: and
selects, among the other vehicles, another vehicle that can communicate with high quality as the backup communication device together with the inter-vehicle communication device,
wherein the controller determines, as a high priority, another vehicle that can back up all of the communication data between the server device and the vehicle, and
wherein the controller determines, as a low priority, another vehicle that can back up a part of the communication data between the server device and the vehicle, the low priority indicating the backup is possible in a degenerated state.

* * * * *